US010829916B2

(12) United States Patent
Cipriani et al.

(10) Patent No.: US 10,829,916 B2
(45) Date of Patent: Nov. 10, 2020

(54) USER INTERFACE FOR A FAUCET

(71) Applicant: Delta Faucet Company, Indianapolis, IN (US)

(72) Inventors: Mark A. Cipriani, Carmel, IN (US); Michael J. Veros, Carmel, IN (US); Todd Andrew Huffington, Avon, IN (US); Jeremy Schmitt, Fishers, IN (US); Mercedita Andrew, Seattle, WA (US); Joel D. Sawaski, Indianapolis, IN (US); Michael Scot Rosko, Greenwood, IN (US); Raoul Labrie, Shelbyville, IN (US)

(73) Assignee: Delta Faucet Company, Indianapolis, IN (US)

( * ) Notice: Subject to any disclaimer, the term of this patent is extended or adjusted under 35 U.S.C. 154(b) by 149 days.

(21) Appl. No.: 15/962,571

(22) Filed: Apr. 25, 2018

(65) Prior Publication Data

US 2018/0313069 A1 Nov. 1, 2018

Related U.S. Application Data

(60) Provisional application No. 62/490,585, filed on Apr. 26, 2017.

(51) Int. Cl.
*E03C 1/04* (2006.01)
*F16K 31/60* (2006.01)
*E03C 1/05* (2006.01)

(52) U.S. Cl.
CPC .......... *E03C 1/0412* (2013.01); *E03C 1/0404* (2013.01); *E03C 1/055* (2013.01);
(Continued)

(58) Field of Classification Search
CPC ....... E03C 1/0404; E03C 1/0412; F16K 31/60
See application file for complete search history.

(56) References Cited

U.S. PATENT DOCUMENTS 2,199,129 A * 4/1940 Hamilton ........... G05D 23/1346
236/12.16
2,847,031 A * 8/1958 Brown, Jr. ............ F16K 11/202
137/637.4
(Continued)

FOREIGN PATENT DOCUMENTS

CN 106122520 11/2016
EP 2690328 1/2014
(Continued)

*Primary Examiner* — Seth W. MacKay-Smith
(74) *Attorney, Agent, or Firm* — Faegre Drinker Biddle & Reath LLP

(57) ABSTRACT

A faucet user interface illustratively includes a support extending along a longitudinal axis, and a handle operably coupled to the support. In an illustrative embodiment, the handle is rotatable about the longitudinal axis for controlling a first water parameter (e.g., water temperature), and the handle is axially movable along the longitudinal axis for controlling a second water parameter (e.g., water flow rate). In another illustrative embodiment, a first handle is rotatable about a longitudinal axis of a delivery spout for controlling a first water parameter, and a second handle is rotatable about the longitudinal axis of the delivery spout for controlling a second water parameter.

22 Claims, 15 Drawing Sheets

(52) U.S. Cl.
CPC ...... *F16K 31/60* (2013.01); *E03C 2001/0418* (2013.01); *Y10T 137/87579* (2015.04); *Y10T 137/87676* (2015.04)

(56) References Cited

U.S. PATENT DOCUMENTS

| | | | |
|---|---|---|---|
| 4,562,864 A | 1/1986 | Yang | |
| 4,735,357 A * | 4/1988 | Gregory | E03C 1/057 137/801 |
| 5,351,347 A * | 10/1994 | Kunkel | E03C 1/057 137/607 |
| 5,358,213 A | 10/1994 | Pilolla | |
| 5,983,938 A | 11/1999 | Bowers et al. | |
| 6,340,032 B1 * | 1/2002 | Zosimadis | E03C 1/05 137/552 |
| 6,571,407 B1 | 6/2003 | Skarie | |
| 6,802,335 B2 * | 10/2004 | Jones | E03C 1/04 137/315.15 |
| 6,920,899 B2 | 7/2005 | Haenlein et al. | |
| 6,968,860 B1 * | 11/2005 | Haenlein | E03C 1/05 137/599.03 |
| 7,150,293 B2 | 12/2006 | Jonte | |
| 7,171,984 B2 | 2/2007 | Pawelzik et al. | |
| 7,464,418 B2 | 12/2008 | Seggio et al. | |
| 7,537,023 B2 | 5/2009 | Marty et al. | |
| 7,607,449 B2 * | 10/2009 | Herring | E03C 1/04 137/15.18 |
| 7,624,757 B2 | 12/2009 | Schmitt | |
| 7,802,733 B2 * | 9/2010 | Schmitt | G05D 23/1393 137/597 |
| 8,028,355 B2 * | 10/2011 | Reeder | A46B 7/04 4/623 |
| 8,407,827 B1 | 4/2013 | Friedman | |
| 8,407,828 B2 | 4/2013 | Vogel | |
| 8,627,844 B2 | 1/2014 | Allen et al. | |
| 8,631,823 B2 | 1/2014 | Heerklotz | |
| 8,944,105 B2 * | 2/2015 | Rodenbeck | E03C 1/057 137/801 |
| 9,074,357 B2 * | 7/2015 | Meehan | E03C 1/0401 |
| 9,234,606 B2 | 1/2016 | Bock-Aronson et al. | |
| 9,333,698 B2 * | 5/2016 | DeVries | B29C 51/12 |
| 9,341,278 B2 | 5/2016 | Esche | |
| 9,567,734 B2 | 2/2017 | Davidson et al. | |
| 9,958,418 B2 * | 5/2018 | Kaneko | H03K 17/96 |
| 2005/0076960 A1 | 4/2005 | Luig et al. | |
| 2006/0101575 A1 * | 5/2006 | Louis | E03C 1/046 4/676 |
| 2006/0138246 A1 * | 6/2006 | Stowe | E03C 1/05 236/12.12 |
| 2009/0058088 A1 * | 3/2009 | Pitchford | G01D 4/004 290/50 |
| 2010/0180968 A1 | 7/2010 | Heerklotz | |
| 2010/0288365 A1 * | 11/2010 | McEnaney | E03C 1/0412 137/1 |
| 2012/0318364 A1 * | 12/2012 | Sawaski | E03C 1/055 137/1 |
| 2015/0076252 A1 * | 3/2015 | Peteri | E03C 1/0404 239/428.5 |
| 2015/0292187 A1 * | 10/2015 | Tseng | E03C 1/055 4/677 |
| 2016/0032572 A1 * | 2/2016 | Chen | E03C 1/057 137/78.1 |
| 2016/0362876 A1 * | 12/2016 | Mainka | E03C 1/04 |
| 2017/0002552 A1 * | 1/2017 | Wang | E03C 1/0412 |
| 2017/0211261 A1 * | 7/2017 | Fuseya | E03C 1/044 |
| 2017/0321363 A1 * | 11/2017 | Kawaguchi | D06F 23/06 |
| 2019/0220046 A1 * | 7/2019 | Huang | E03C 1/0404 |

FOREIGN PATENT DOCUMENTS

| | | |
|---|---|---|
| JP | 2009127379 | 6/2009 |
| WO | WO 2013/093521 | 6/2013 |
| WO | WO 2013/093522 | 6/2013 |

* cited by examiner

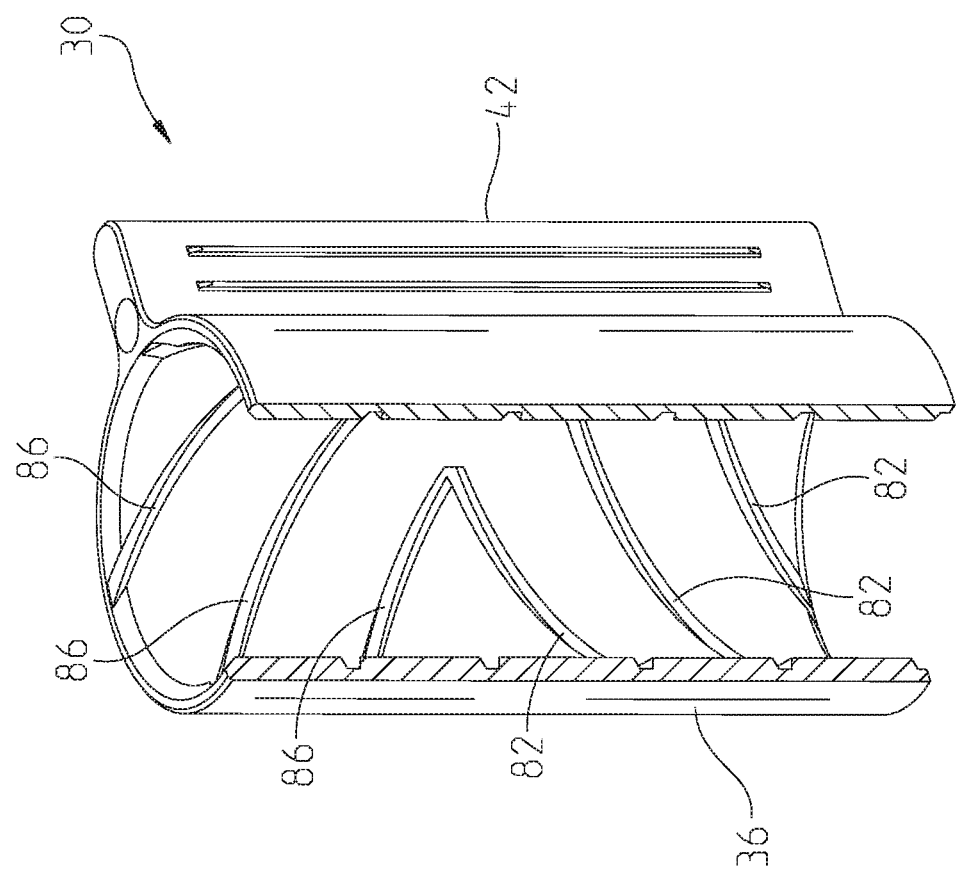
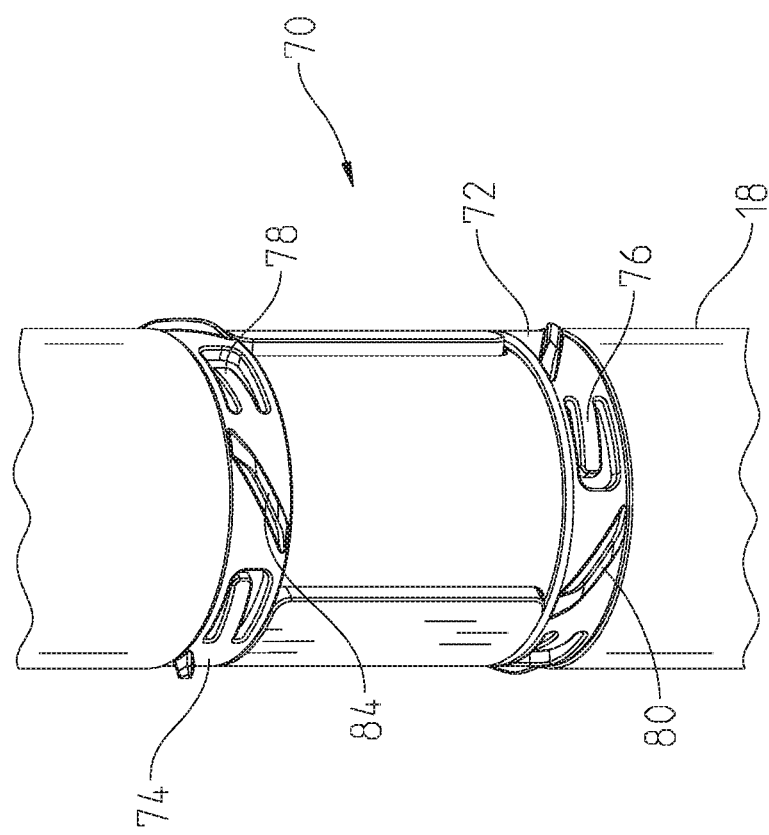

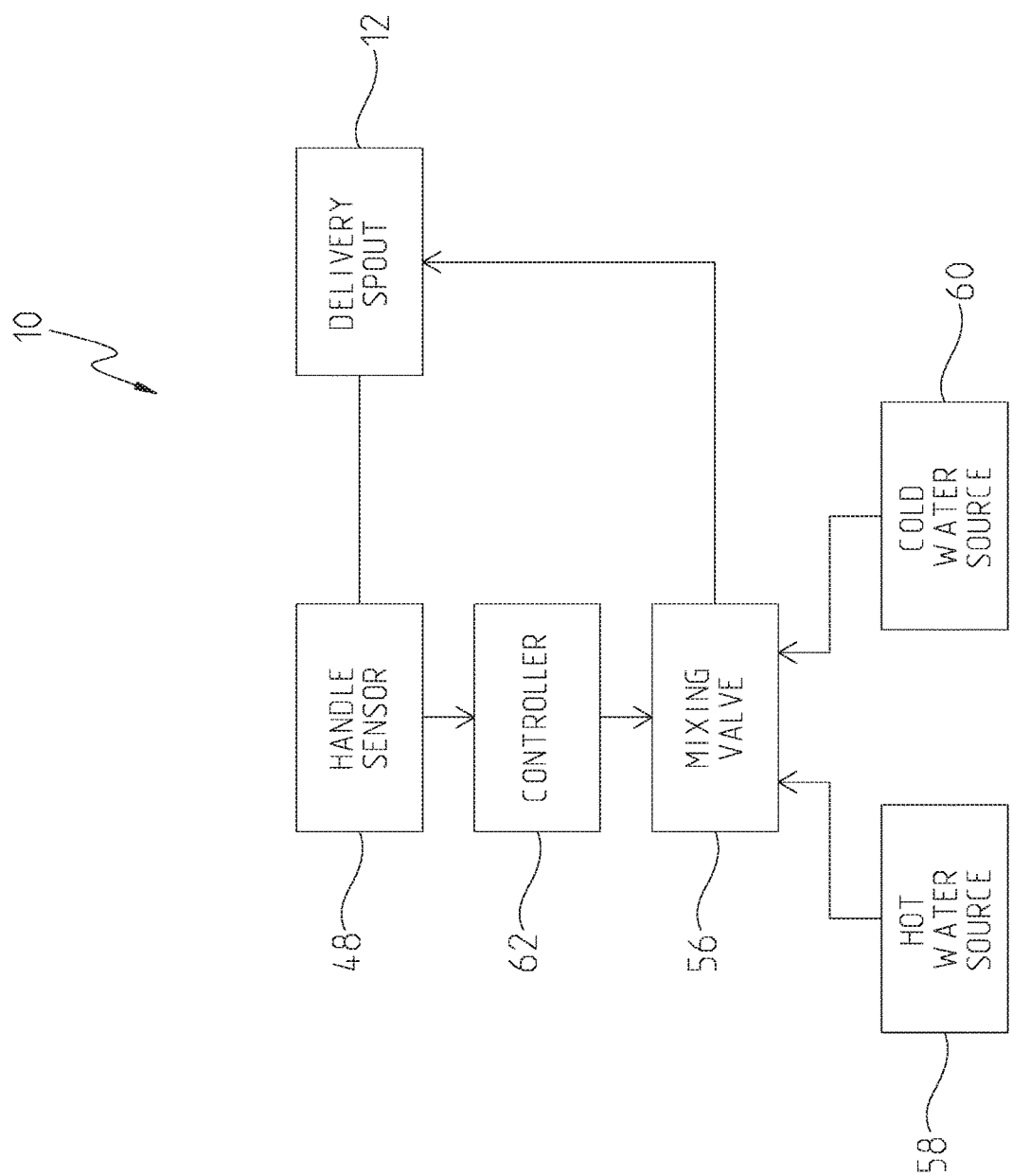

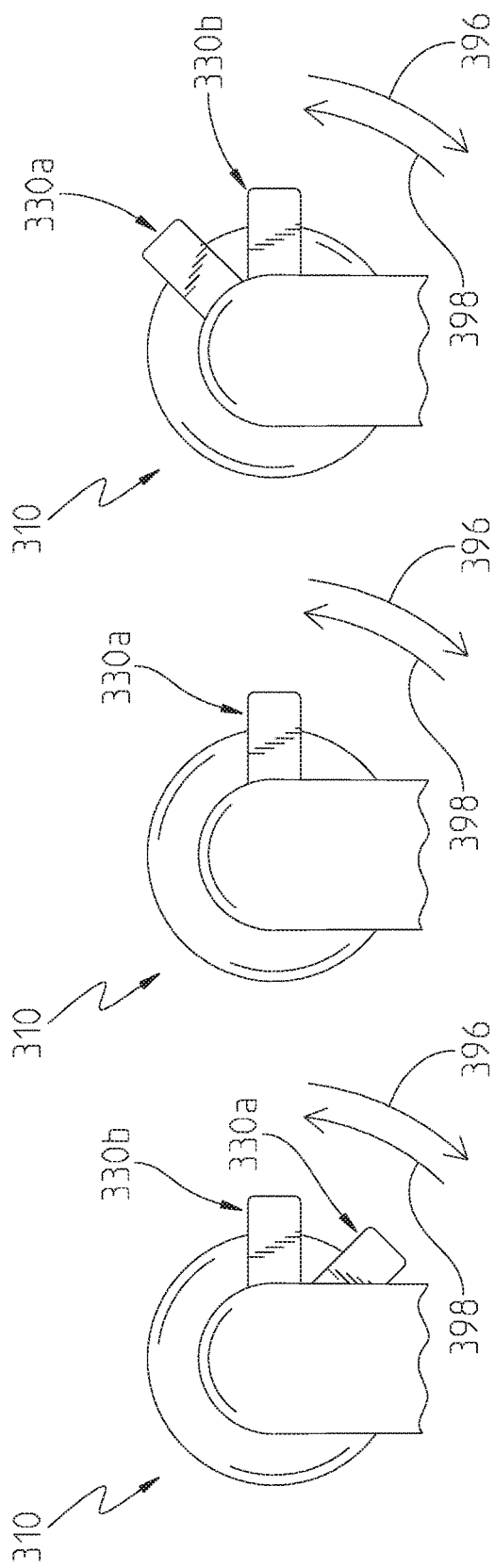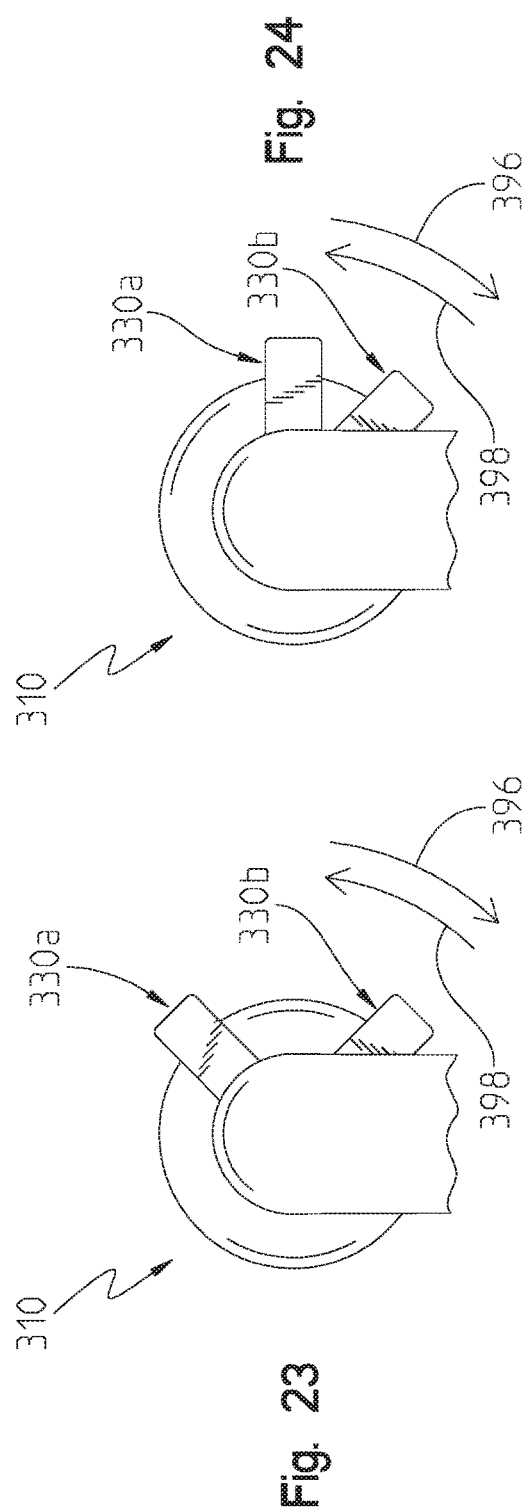

USER INTERFACE FOR A FAUCET

CROSS-REFERENCE TO RELATED APPLICATION

This application claims priority to U.S. Provisional Patent Application, Ser. No. 62/490,585, filed Apr. 26, 2017, the disclosure of which is expressly incorporated herein by reference.

BACKGROUND AND SUMMARY OF THE DISCLOSURE

The present disclosure relates to a faucet and, more particularly, to a user interface for controlling an electrically operable valve of a faucet.

It is desired to provide a structure and related method of moving a faucet handle in rotation for controlling a first water parameter, and in linear movement for controlling a second water parameter, wherein the faucet handle provides for smooth operation so that fine adjustments can be made. The illustrative faucet handle includes a tube or collar that rotates and translates on a straight section of a cylindrical portion of the faucet, illustratively a tubular delivery spout. End or limit stops are provided to limit travel both rotationally and longitudinally. The first water parameter illustratively comprises water temperature, wherein rotational movement of the faucet handle may control the temperature of water discharged from an outlet of the delivery spout. The second water parameter illustratively comprises water flow rate, wherein translational movement may control the flow rate of water discharged from the outlet of the delivery spout. An axial restraining device illustratively introduces friction for yielding a stable faucet handle while providing smooth operation.

According to an illustrative embodiment of the present disclosure, a faucet user interface includes a support extending along the longitudinal axis, and a handle operably coupled to the support. The handle is rotatable about the longitudinal axis for controlling a first water parameter, and the handle is axially moveable along the longitudinal axis for controlling a second water parameter.

According to another illustrative embodiment of the present disclosure, a faucet includes a delivery spout having an inlet, an outlet and a linear portion positioned intermediate the inlet and the outlet and extending along a longitudinal axis. A handle is supported by the linear portion of the delivery spout. An electrically operable valve is in fluid communication with the outlet of the delivery spout. A controller is in electrical communication with the electrically operable valve. A sensor is supported by the delivery spout and is in electrical communication with the controller. Rotation of the handle about the longitudinal axis of the delivery spout is detected by the sensor for controlling a first water parameter, an axial movement of the handle along the longitudinal axis is detected by the sensor for controlling a second water parameter.

According to a further illustrative embodiment of the present disclosure, a faucet user interface includes a hub extending along a longitudinal axis, a first handle operably coupled to the hub, and a second handle operably coupled to the hub. The first handle is rotatable about the longitudinal axis for controlling a first water parameter, and the second handle is rotatable about the longitudinal axis for controlling a second water parameter. In a variation of this further illustrative embodiment, the first water parameter is a water flow rate and the second water parameter is a water temperature.

According to another illustrative embodiment of the present disclosure, a faucet includes a delivery spout having an inlet, an outlet, and a linear portion positioned intermediate the inlet and the outlet and extending along a longitudinal axis. A first handle and a second handle are supported by the linear portion of the delivery spout. A first electrically operable valve is in fluid communication with the outlet of the delivery spout. A controller is in electrical communication with the electrically operable valve. A first sensor and a second sensor are supported by the delivery spout and are in electrical communication with the controller. Rotation of the first handle about the longitudinal axis of the delivery spout is detected by the first sensor for controlling a first water parameter. Rotation of the second handle about the longitudinal axis of the delivery spout is detected by the second sensor for controlling a second water parameter. In a variation of this illustrative embodiment, the first water parameter is water flow rate and the second water parameter is water temperature.

According to a further illustrative embodiment of the present disclosure, a faucet includes a delivery spout having an inlet, an outlet and a center axis extending between the inlet and the outlet. A first handle is rotatably supported by the delivery spout, and a second handle is rotatably supported by the delivery spout. A first sensor is supported by the delivery spout and is operably coupled to the first handle, and a second sensor is supported by the delivery spout and is operably coupled to the second handle. A controller is in electrical communication with the first sensor and the second sensor, wherein rotation of the first handle about the center axis of the delivery spout is detected by the first sensor, and rotation of the second handle about the center axis of the delivery spout is detected by the second sensor.

Additional features and advantages of the present invention will be become apparent to those skilled in the art upon consideration of the following detailed description of the illustrative embodiments exemplifying the best mode of carrying out the invention as presently perceived.

BRIEF DESCRIPTION OF DRAWINGS

A detailed description of the drawings particularly refers to the accompanying figures, in which:

FIG. 5 is a detailed perspective view of the hub including axial retainer;

FIG. 6 is a perspective view of the handle;

FIG. 7 is a block diagram of the illustrative faucet of FIG. 1;

FIG. 20 is a partial top plan view of the illustrative faucet of FIG. 16 with the first handle in a fully rotated forward position and the second handle in an intermediate position;

FIG. 21 is partial top plan view of the illustrative faucet of FIG. 16 with the first handle and the second handle in their intermediate positions;

FIG. 22 is a partial top plan view of the illustrative faucet of FIG. 16 with the first handle in a fully rotated away position and the second handle in the intermediate position;

FIG. 23 is a partial top plan view of the illustrative faucet of FIG. 16 with the first handle in the fully rotated away position and the second handle in a fully rotated forward position;

FIG. 24 is a partial top plan view of the illustrative faucet of FIG. 16 with the first handle in the intermediate position and the second handle in the fully rotated forward position;

DETAILED DESCRIPTION OF THE DRAWINGS

Figure 1:
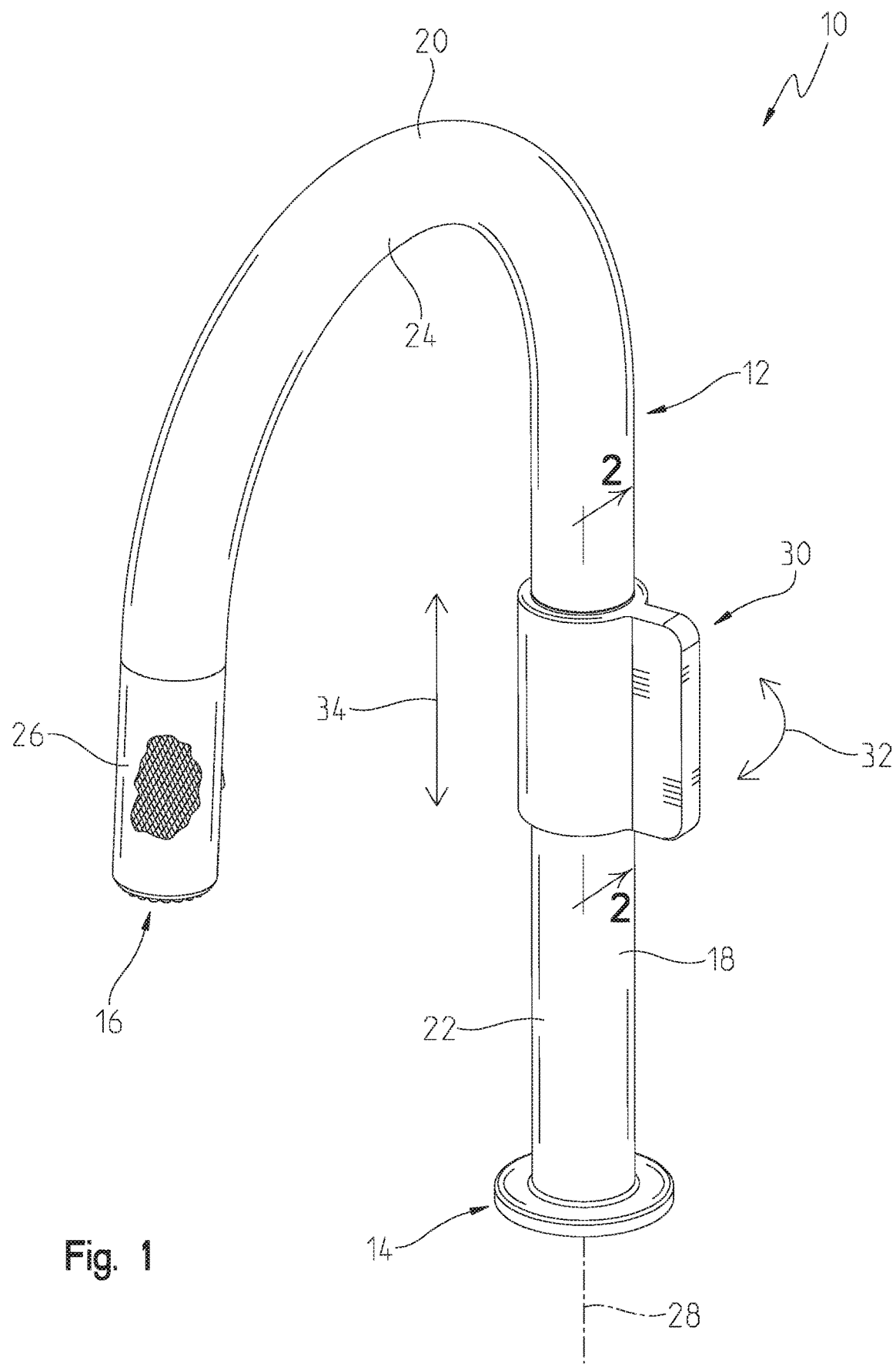
FIG. 1 is a perspective view of an illustrative faucet.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

Referring initially to FIG. 1, an illustrative embodiment faucet 10 includes a delivery spout 12 including an inlet 14 and an outlet 16. The delivery spout 12 may include a hub 18 supporting an upper portion 20. The hub 18 illustratively includes a straight or linear portion 22, while the upper portion 20 is illustratively J-shaped as including an arcuate portion 24. The outlet 16 may be defined by a removable sprayhead 26 (typically called a pulldown or pullout sprayhead). The linear portion 22 is positioned intermediate the inlet 14 and the outlet 16 and defines a longitudinal axis 28. A water control handle 30 is supported by the linear portion 22 of the delivery spout 12.

The handle 30 is rotatable about the longitudinal axis 28 (as shown by arrows 32) for controlling a first water parameter, and the handle 30 is axially moveable along the longitudinal axis 28 (as shown by arrows 34) for controlling a second water parameter. Illustratively, the first water parameter is water temperature at the outlet 16, and the second water parameter is water flow rate at the outlet 16.

Figure 2:
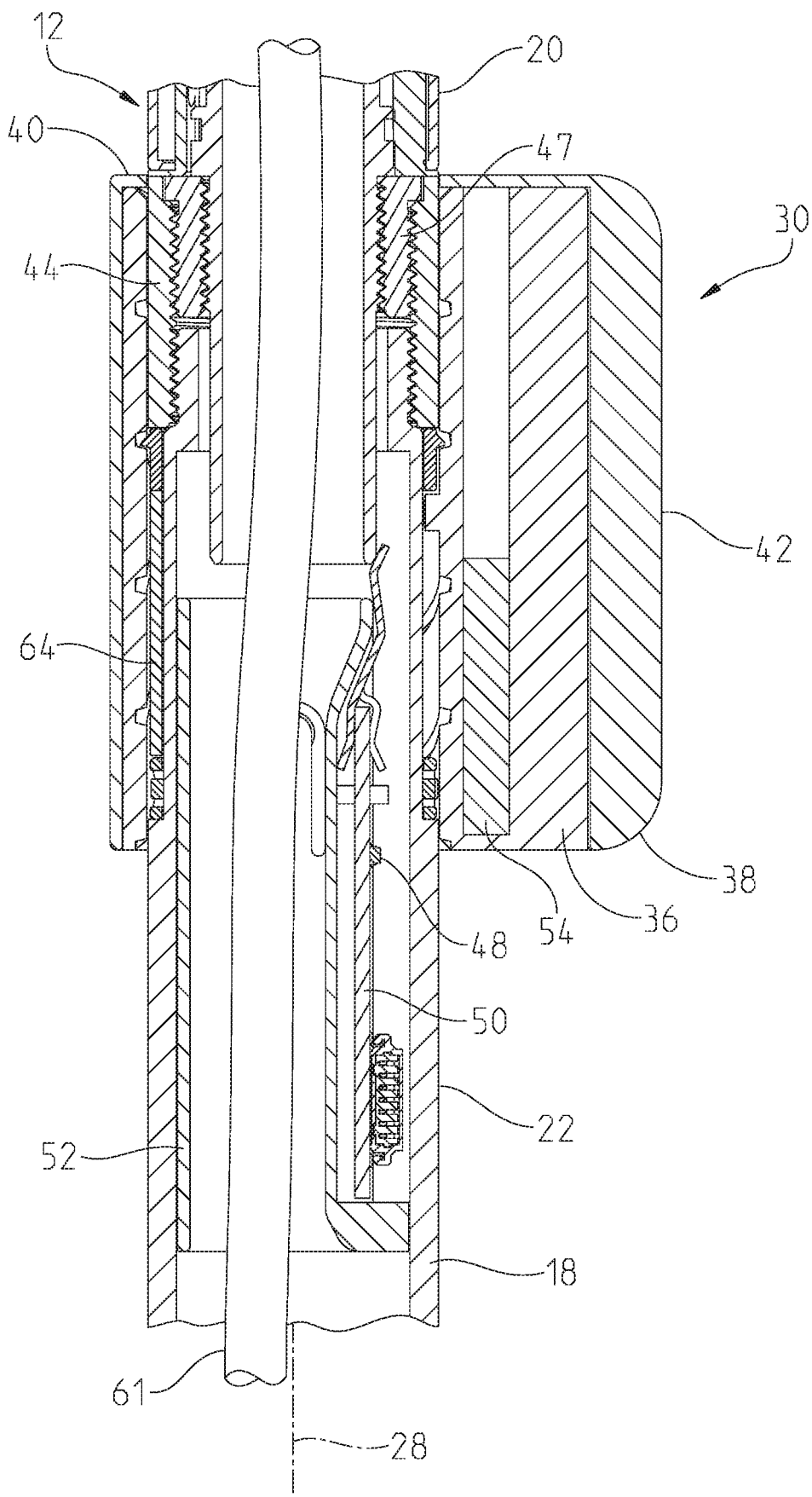
FIG. 2 is a cross-sectional view of the illustrative faucet of FIG. 1.
Figure 3:
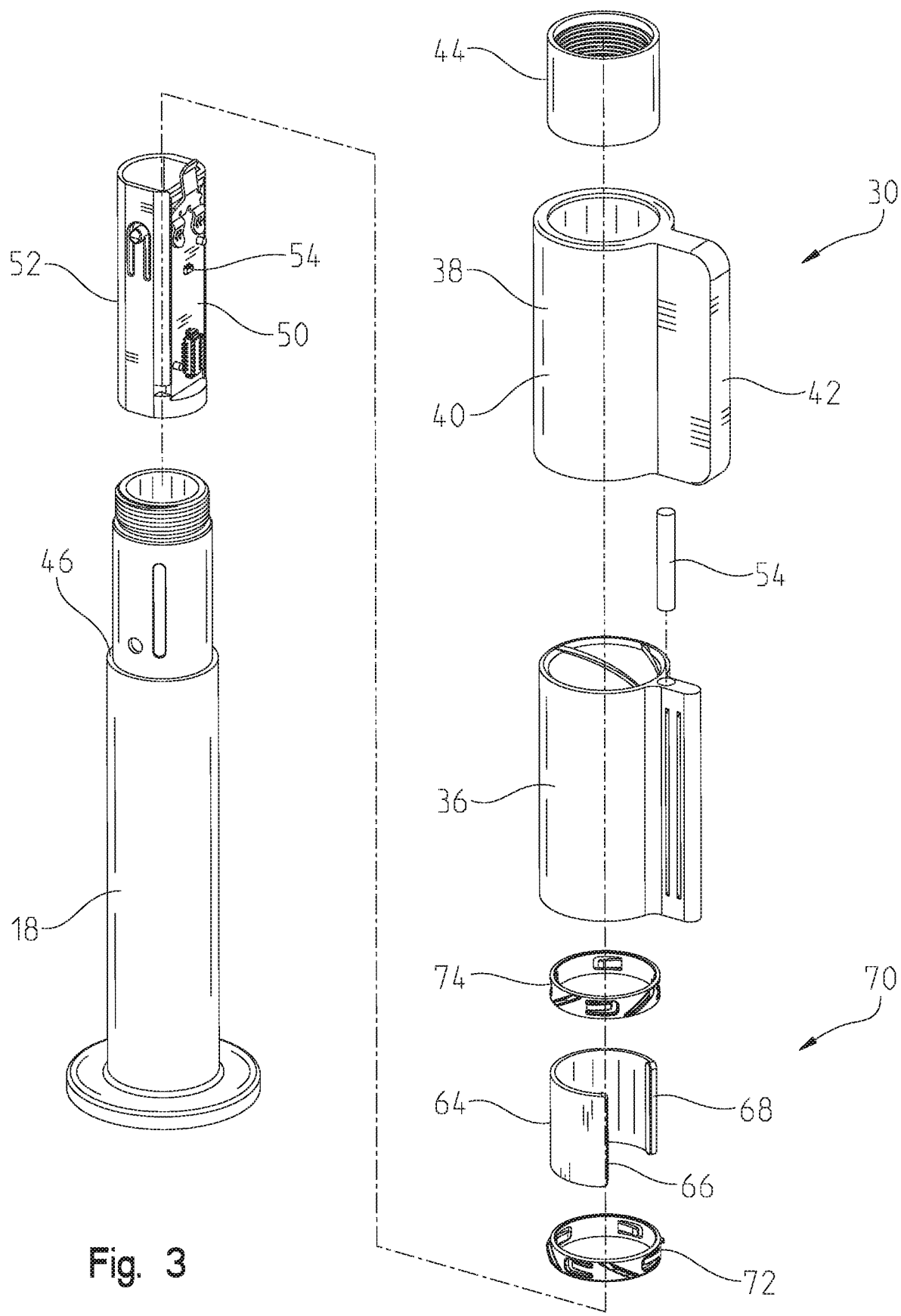
FIG. 3 is an exploded perspective view.
Figure 4:
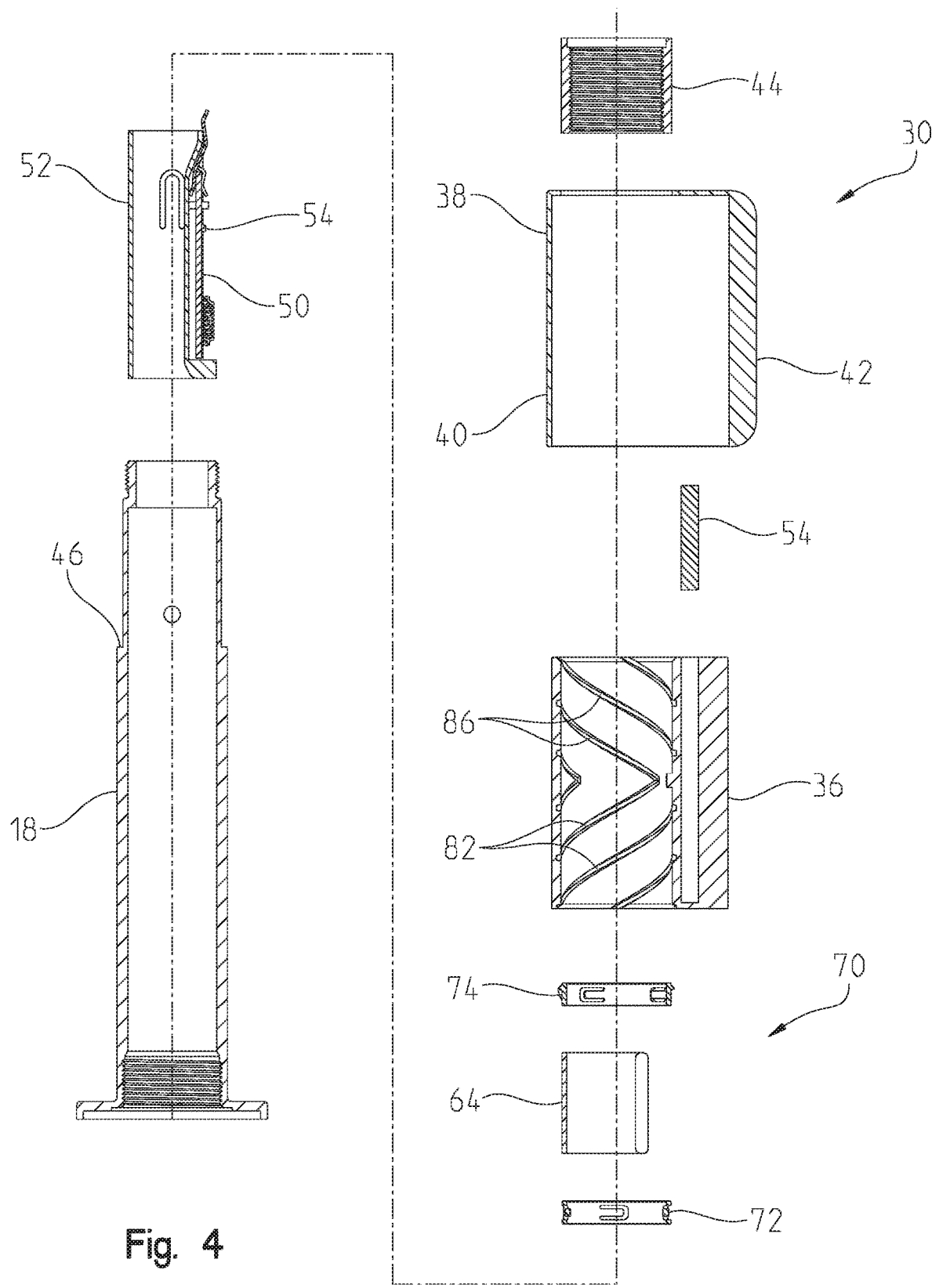
FIG. 4 is a cross-sectional view of the exploded perspective view of FIG. 3.

With reference to FIGS. 2-4, the handle 30 illustratively includes an inner portion or shell 36, and an outer portion or shell 38. The handle 30 illustratively includes an inner collar or tube 40 concentrically receiving the linear portion 22 of the delivery spout 12. The collar 40 is slidably received on the delivery spout 12 for linear movement along the longitudinal axis 28. The collar 40 is also rotatably supported on the delivery spout 12 for rotation about the longitudinal axis 28. A blade 42 illustratively extends radially outwardly from the collar 40. A threaded hub top or nut 44 is threadably secured to an upper end of the hub 18 to axially retain handle 30. More particularly, the nut 44 defines an upper limit stop, while a lip 46 on the hub 18 defines a lower limit stop. A plastic isolator or spacer 47 is illustratively positioned between the hub 18 and the upper portion 20 of the delivery spout 12.

A handle sensor 48 is illustratively supported by the delivery spout 12. More particularly, the sensor 48 may be supported by a printed circuit board (PCB) 50, which is positioned on a circuit board housing 52. A magnet 54 is illustratively supported by the blade 42 of the handle 30, and is configured to be detected by the sensor 48. In one illustrative embodiment, multiple sensors 48 are supported by the circuit board 50 to provide three-dimensional (3D) detection of the position of the magnet 54 and, as such, the position of the handle 30. In another illustrative embodiment, a single three-dimensional (3D) sensor is provided on the circuit board 50. Illustratively, the sensor 48 may comprise a conventional Hall-effect sensor.

An electrically operable valve 56, illustratively a mixing valve or electronic proportioning valves, is in fluid communication with a hot water source 58 and a cold water source 60. The valve 56 illustratively controls the flow rate and the temperature of water delivered to the outlet 16 of the delivery spout 12. A flexible outlet hose or tube 61 illustratively extends within the delivery spout 12 and fluidly couples an outlet port of the electrically operable valve 56 to the outlet 16 of the sprayhead 26. A controller 62 is in communication with the valve 56 and the sensor 48. As such, movement of the handle 30 is detected by the sensor 48, which provides a signal to the controller 62, which in turn controls the valve 56.

A collar spacer 64 is supported within the delivery spout 12 and provides rotational limit stops 66 and 68 for the handle 30. An axial retainer 70 prevents the handle 30 from falling under its own weight. Illustratively, the axial retainer 70 provides a predetermined amount of friction between the handle 30 and the delivery spout 12. Standard methods of introducing friction for translational motion will have a significant difference between the static and dynamic friction. This may result in the handle 30 jumping when the static friction is overcome and the friction drops as motion begins. As such, smooth operation may be difficult to achieve.

The axial retainer 70 converts the translational motion of the handle 30 to a rotational motion of two friction rings 72 and 74. The change of torque to rotate the rings 72 and 74 at rest and while moving is much less noticeable to the user and results in smooth operation.

The lower friction ring 72 and the upper friction ring 74 are supported by the hub 18. Each ring 72 and 74 illustratively includes a plurality of inwardly biased tabs 76 and 78, respectively, to engage the outer surface of the hub 18. The lower friction ring 72 illustratively includes a plurality of first tabs or threads 80 configured to engage first inner grooves 82 formed in the inner surface of the collar 40. Similarly, the upper friction ring 74 illustratively includes a plurality of second tabs or threads 84 configured to engage second inner grooves 86 formed in the inner surface of the collar 40. Illustratively, the first inner grooves 82 of the collar 40 are left handed threads, while the second inner grooves 86 of the collar 40 are right handed threads. The tabs 80 and 84 are illustratively received within the left handed threads 82 and the right handed threads 86, respectively, of the collar 40.

The internal threads 82 and 86 of the handle 30 mate with the tabs 80 and 84 on the rings 72 and 74. As the handle 30 is slid up/down, the rings 72 and 74 rotate. Tabs 76 and 78 on the rings 72 and 74 introduce friction between the rings 72 and 74 and the cylinder 18 they surround. The thread angle should be steep enough to not result in self-locking or it will be impossible to move the handle 30 up/down.

Because the threads 82 and 86 are not self-locking, the handle 30 would "unscrew" and fall in relation to the static ring if a single ring were used. Each of the two rings 72 and 74 use opposite left-hand 82 and right-hand threads 86, and the handle 30 contains the matching thread in the portions that mate with each ring 72 and 74. When the handle 30 is slid up/down, the rings 72 and 74 will rotate in opposite directions. The use of two rings 72 and 74 prevents the handle 30 from being able to "unscrew" and fall due to the counterbalancing of loads.

Figure 8:
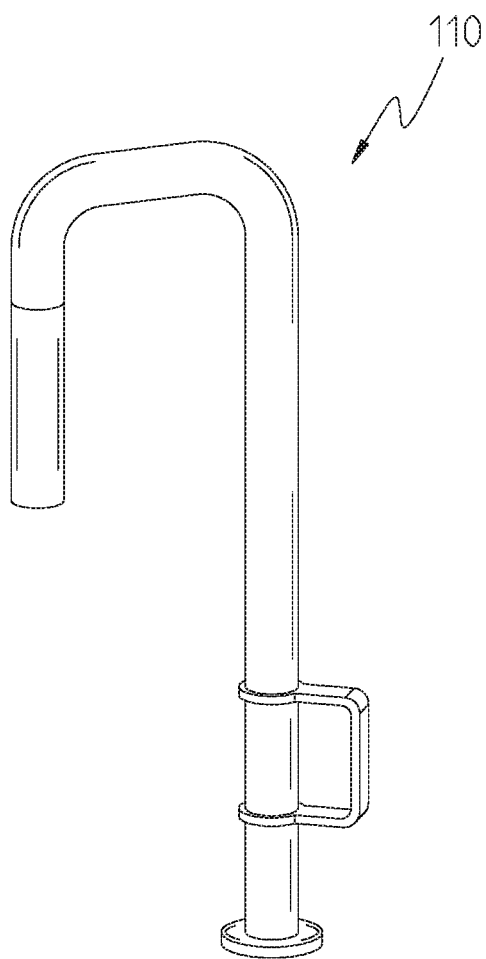
FIG. 8 is a perspective view of a further illustrative embodiment of the faucet.
Figure 9:
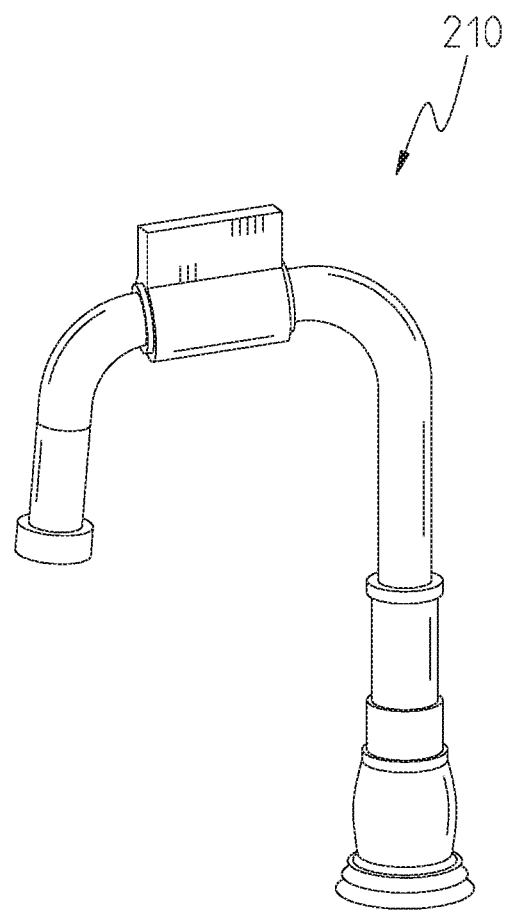
FIG. 9 is a perspective view of another illustrative embodiment of the faucet.

FIGS. 8 and 9 are perspective views of further illustrative embodiment faucets 110 and 210, respectively. Faucet 110 has a different design of handle 30, while faucet 210 has a different location of the handle 30.

Figure 10A:
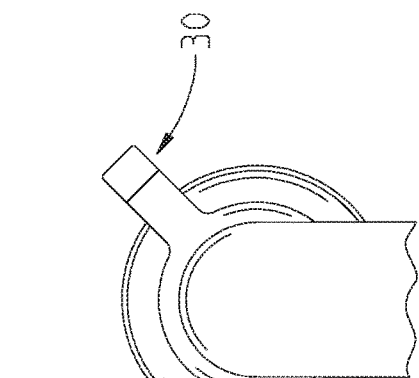
FIG. 10A is partial top plan view of the illustrative faucet of FIG. 1, showing the handle in a low water flow, cold water position.
Figure 10B:
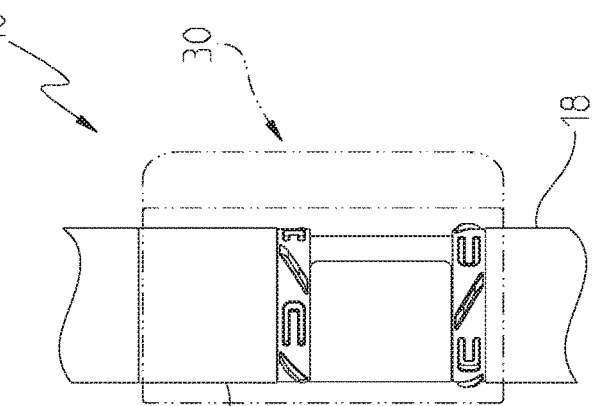
FIG. 10B is a side elevational view of the handle of FIG. 10A in the low water flow, cold water position, with the handle shown in phantom.

FIG. 10A is partial top plan view of the illustrative faucet 10 of FIG. 1, showing the handle 30 in a low water flow, cold water position. FIG. 10B is a side elevational view of the handle 30 of FIG. 10A in the low water flow, cold water position, with the handle 30 shown in phantom.

Figure 11A:
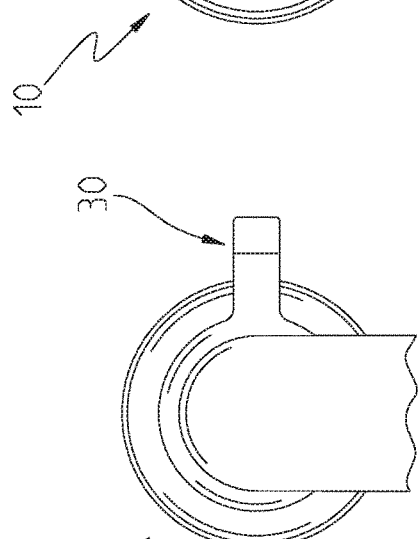
FIG. 11A is partial top plan view of the illustrative faucet of FIG. 1, showing the handle in a low water flow, mixed water temperature position.
Figure 11B:
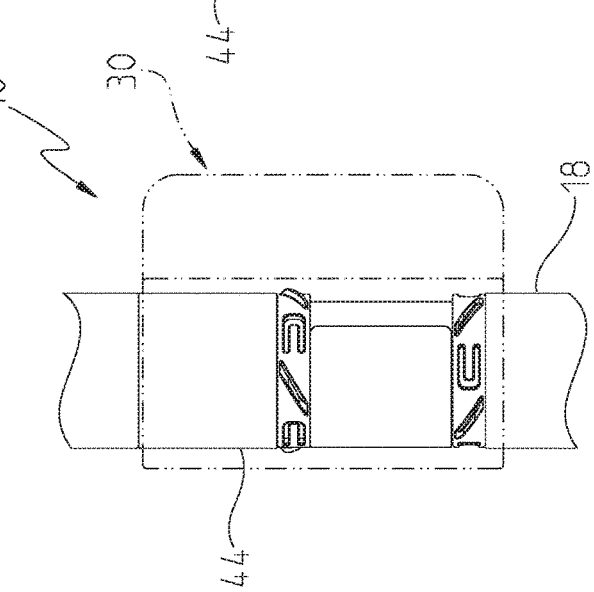
FIG. 11B is a side elevational view of the handle of FIG. 11A in the low water flow, mixed water temperature position, with the handle shown in phantom.

FIG. 11A is partial top plan view of the illustrative faucet 10 of FIG. 1, showing the handle 30 in a low water flow, mixed water temperature position. FIG. 11B is a side elevational view of the handle 30 of FIG. 11A in the low water flow, mixed water temperature position, with the handle 30 shown in phantom.

Figure 12A:
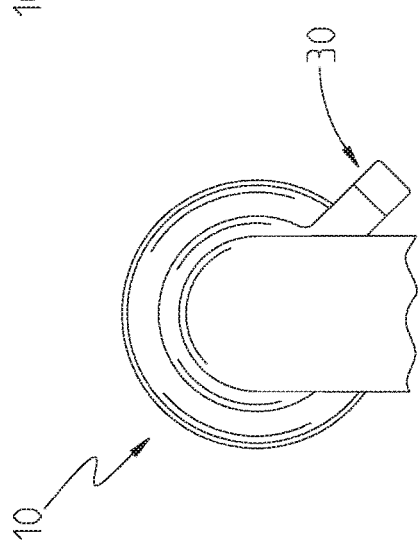
FIG. 12A is partial top plan view of the illustrative faucet of FIG. 1, showing the handle in a low water flow, hot water temperature position.
Figure 12B:
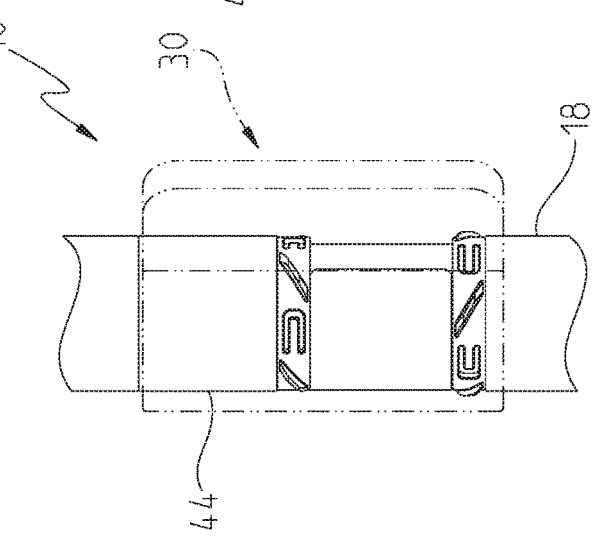
FIG. 12B is a side elevational view of the handle of FIG. 12A in the low water flow, hot water temperature position, with the handle shown in phantom.

FIG. 12A is partial top plan view of the illustrative faucet 10 of FIG. 1, showing the handle 30 in a low water flow, hot water temperature position. FIG. 12B is a side elevational view of the handle 30 of FIG. 12A in the low water flow, hot water temperature position, with the handle 30 shown in phantom.

Figure 13A:
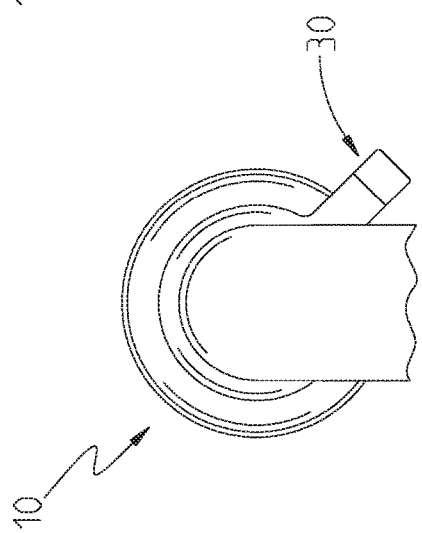
FIG. 13A is partial top plan view of the illustrative faucet of FIG. 1, showing the handle in a high water flow, cold water temperature position.
Figure 13B:
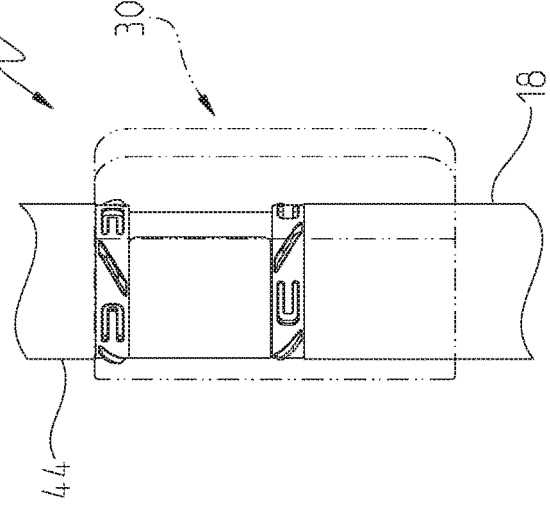
FIG. 13B is a side elevational view of the handle of FIG. 13A in the high water flow, cold water temperature position, with the handle shown in phantom.

FIG. 13A is partial top plan view of the illustrative faucet 10 of FIG. 1, showing the handle 30 in a high water flow, cold water temperature position. FIG. 13B is a side elevational view of the handle 30 of FIG. 13A in the high water flow, cold water temperature position, with the handle 30 shown in phantom.

Figure 14A:
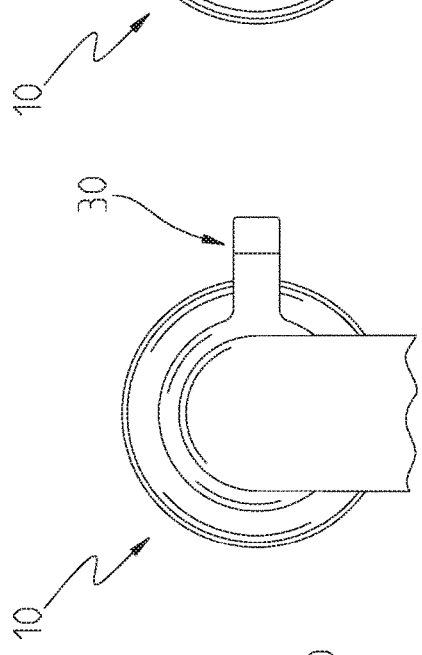
FIG. 14A is partial top plan view of the illustrative faucet of FIG. 1, showing the handle in a high water flow, mixed water temperature position.
Figure 14B:
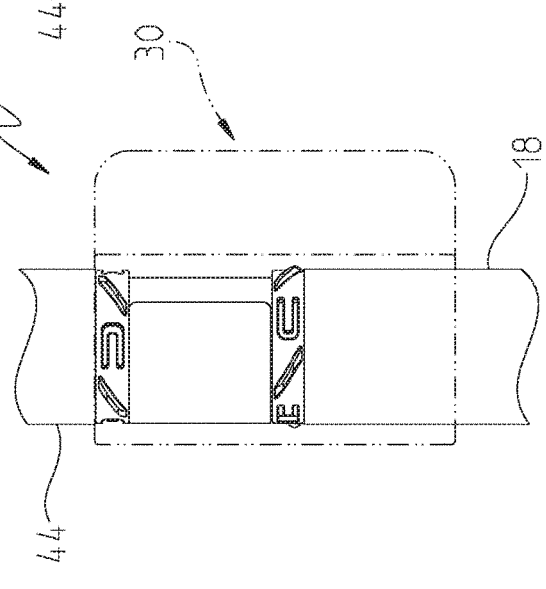
FIG. 14B is a side elevational view of the handle of FIG. 14A in the high water flow, mixed water temperature position, with the handle shown in phantom.

FIG. 14A is partial top plan view of the illustrative faucet 10 of FIG. 1, showing the handle 30 in a high water flow, mixed water temperature position. FIG. 14B is a side elevational view of the handle 30 of FIG. 14A in the high water flow, mixed water temperature position, with the handle 30 shown in phantom.

Figure 15A:
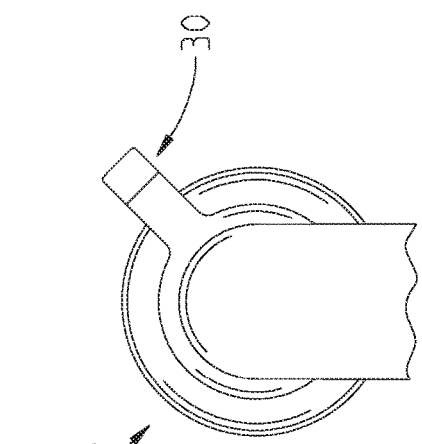
FIG. 15A is partial top plan view of the illustrative faucet of FIG. 1, showing the handle in a high water flow, hot water temperature position.
Figure 15B:
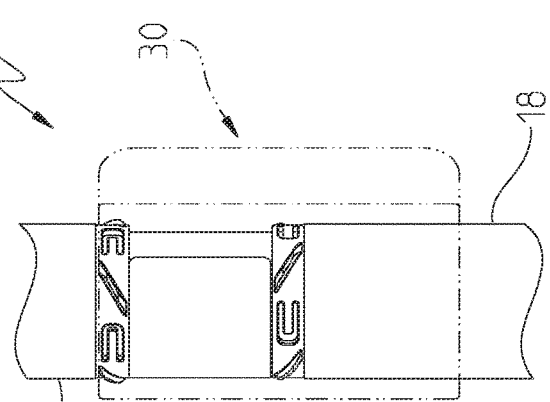
FIG. 15B is a side elevational view of the handle of FIG. 15A in the high water flow, hot water temperature position, with the handle shown in phantom

FIG. 15A is partial top plan view of the illustrative faucet 10 of FIG. 1, showing the handle 30 in a high water flow, hot water temperature position. FIG. 15B is a side elevational view of the handle 30 of FIG. 15A in the high water flow, hot water temperature position, with the handle 30 shown in phantom.

Figure 16:
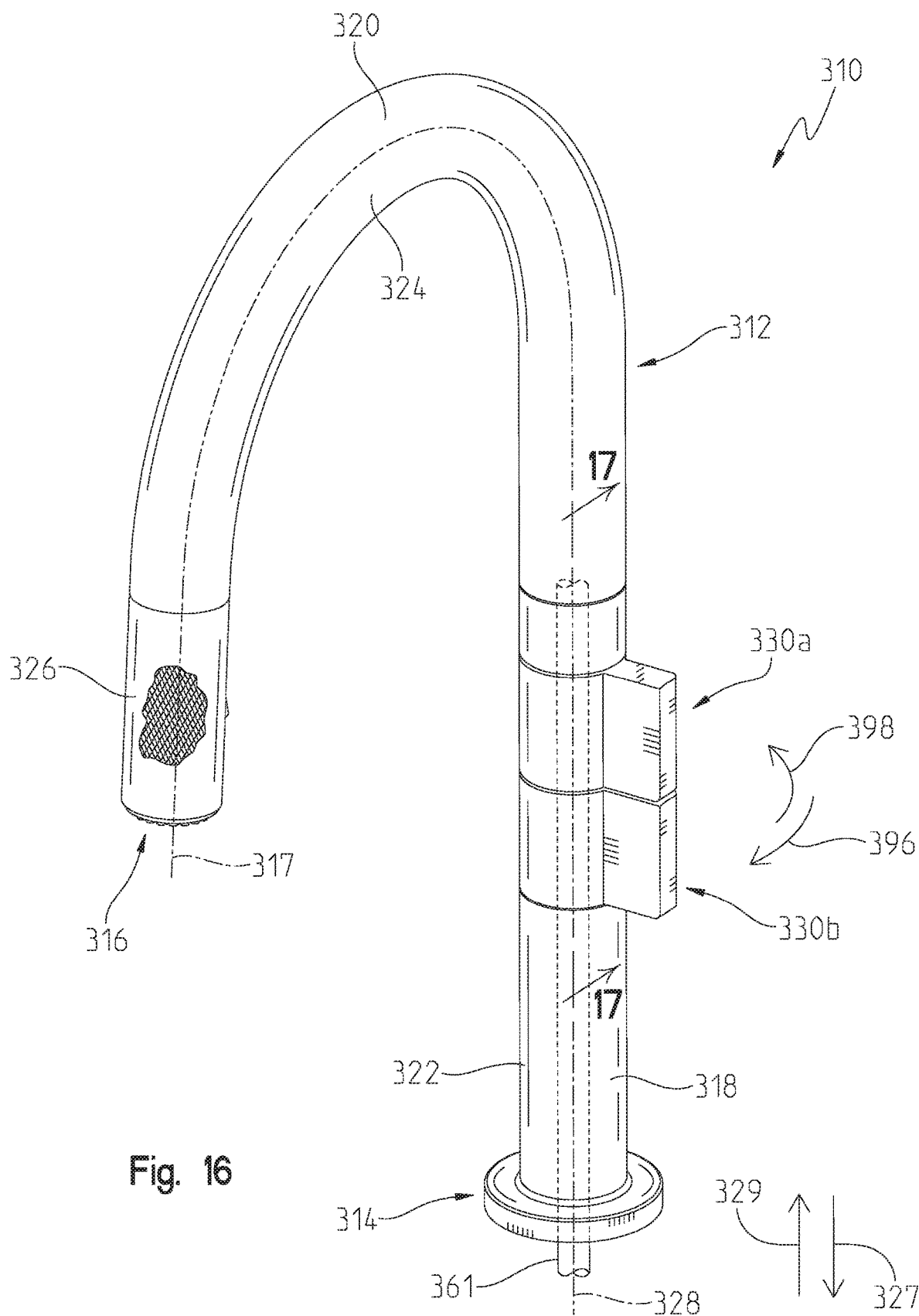
FIG. 16 is a perspective view of a further illustrative embodiment of the faucet including a first handle controlling a first water parameter, and a second handle for controlling a second water parameter.
Figure 17:
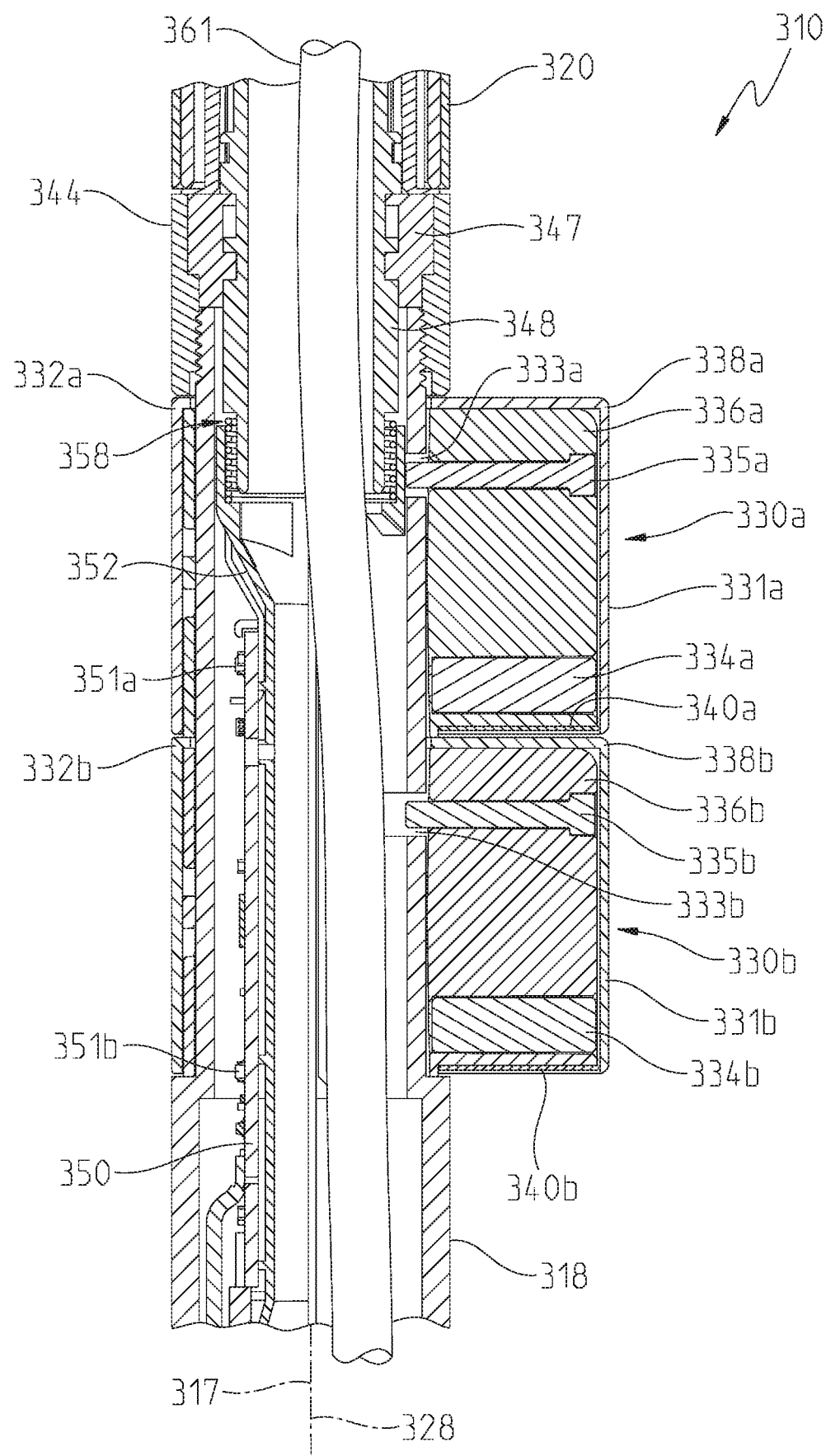
FIG. 17 is a cross-sectional view of the illustrative faucet of FIG. 16.
Figure 18:
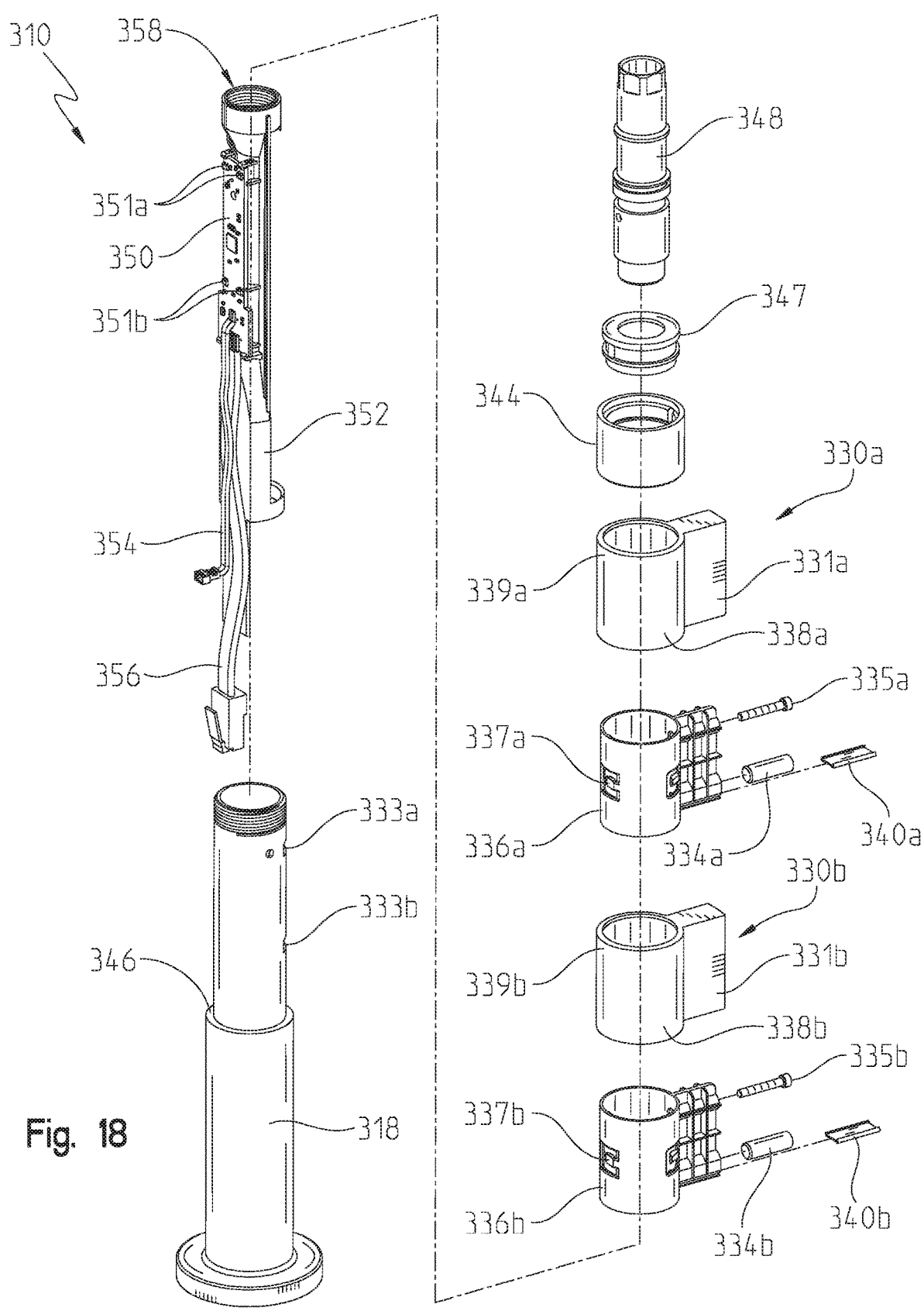
FIG. 18 is an exploded perspective view of the illustrative faucet of FIG. 16.

FIGS. 16-18 show a further illustrative embodiment faucet 310. Faucet 310 illustrative includes a delivery spout 312 including an inlet 314 and an outlet 316. As is known, the delivery spout 312 is defined by at least one tubular member including a center axis 317 extending between the inlet 314 and the outlet 316. The delivery spout 312 may include a hub 318 supporting an upper or cantilevered portion 320. The hub 318 is configured to mount to a mounting surface, for example, a sink deck or countertop. The hub 318 illustratively includes a straight or linear portion 322, while the upper portion 320 is illustratively J-shaped and includes an arcuate portion 324. While the upper portion 320 of faucet 310 has an illustratively J-shaped profile, it is contemplated that upper portion 320 may comprise different geometric profiles, including linear and curvilinear shapes. The outlet 316 may be defined by a removable sprayhead 326 (typically called a pulldown or pullout sprayhead or wand).

The linear portion 322 of faucet 310 is positioned intermediate the inlet 314 and the outlet 316 and defines a longitudinal axis 328 (e.g., part of the center axis 317). Linear portion 322 illustratively supports a first rotatable handle 330a and a second rotatable handle 330b. In the exemplary embodiment shown, the second handle 330b is arranged longitudinally of the first handle 330a along the longitudinal axis 328 in an axial direction 327 (i.e., below the first handle 330a).

In the illustrative embodiment shown, the handles 330a, 330b are independently rotatable about the longitudinal axis 328. More specifically, the first rotatable handle 330a rotates about longitudinal axis 328 to control a first water parameter and the second rotatable handle 330b rotates about longitudinal axis 328 to control a second water parameter. Illustratively, the first water parameter is a water flow rate, and the second water parameter is a water temperature. In some embodiments, the water flow rate is the water flow rate supplied to the outlet 316, and/or the water temperature is the water temperature supplied to the outlet 316. In an alternative illustrative embodiment, the first water parameter is a flow rate of hot water from a hot water source 362 delivered to the delivery spout 12, and the second water parameter is a flow rate of cold water from a cold water source 366 delivered to the delivery spout (see FIG. 19).

With reference to FIGS. 17 and 18, the handles 330a, 330b illustratively include inner portions 336a, 336b and outer portions 338a, 338b. In the exemplary embodiment shown, the outer portions 338a, 338b comprise a shell configured to receive inner portions 336a, 336b, respectively. Each of the outer portions 338a, 338b of the handles 330a, 330b illustratively further includes collars 339a, 339b that are rotatably supported on the delivery spout 312 for rotation about the longitudinal axis 328. Illustratively, the collars 339a, 339b comprise a tube that concentrically receives the linear portion 322 of delivery spout 312. More specifically, collar 339b abuts a lip 346 of the hub 318. Collar 339a is arranged longitudinally of collar 339b in axial direction 329 and abuts collar 339b.

The outer portions 338a, 338b include longitudinal flanges or blades 331a, 331b extending radially outwardly from the collars 339a, 339b, respectively. The handles 330a, 330b are axially secured to the hub 318 with a threaded hub top or nut 344. The hub top 344 is threadably secured to an upper end of the hub 318. A plastic isolator 347 is illustratively received within an upper recess of the threaded hub top 344 and adjacent the upper portion 320 of the delivery spout 312. In the exemplary embodiment shown, the isolator 347 fixedly secures a hose adapter 348 within the hub top 344. The hose adapter 348 illustratively receives an outlet hose 361 extending within the upper portion 320 of the delivery spout 312 and which is in fluid communication with the outlet 316 to the hub 318. Furthermore, the hose adapter 348 illustratively rotatably couples the upper portion 320 to the hub 318. In the exemplary embodiment shown, the hub top 344 and the hose adapter 348 illustratively comprise a metallic alloy, for example, brass. The isolator 347 may be an injection molded polymer between the hub top 344 and the hose adapter 348 to fixedly secure the hub top 344 to the hose adapter 348. An advantage, among others, of the isolator 347 is that the upper portion 320 is electronically decoupled from the hub 318 in order to facilitate the use of capacitive sensing technology in the upper portion 320. Another advantage, among others, of the isolator 347 is that an aesthetically pleasing appearance and transition between the hub 318 and the upper portion 320 results.

The inner portions 336a, 336b likewise concentrically receive the linear portion 322 of the delivery spout 312. Each of the inner portions 336a, 336b is axially secured to the linear portion 322 with set screws 335a, 335b. Each of the set screws 335a, 335b is received within a recess 333a, 333b of the linear portion 322 such that the handles 330a, 330b are axially restrained in axial directions 327, 329 (as shown in FIG. 16) but are free to rotate about the longitudinal axis 328. In addition, the set screws 335a, 335b may engage the ends of the recesses 333a, 333b of the linear portion 322 when the handles 330a, 330b are rotated about the longitudinal axis 328. In this way, the recesses 333a, 333b in the linear portion 322 and the set screws 335a, 335b provide rotational limit stops for the handles 330a, 330b.

In the exemplary embodiment shown, the inner portions 336a, 336b further include a plurality of inwardly biased friction tabs 337a, 337b configured to engage an outer surface of the hub 318. An advantage, among others, of the friction tabs 337a, 337b is that a resistive feedback is provided to the user during rotation of the handles 330a, 330b about the longitudinal axis 328. Another advantage, among others, of the friction tabs 337a, 337b is that the handles 330a, 330b retain their angular position following rotation about the longitudinal axis 328. To that end, a user must apply a force to the handles 330a, 330b sufficient to overcome the frictional force supplied by the friction tabs 337a, 337b to effect rotation of handles 330a, 330b about the longitudinal axis 328.

Each of the inner portions 336a, 336b illustratively supports a magnet 334a, 334b, respectively. The magnets 334a, 334b are received within a recess of inner portions 336a, 336b. In the exemplary embodiment shown, magnets 334a, 334b comprise a cylindrical shape and are oriented perpendicular to the longitudinal axis 328. It is contemplated, however, that magnets 334a, 334b may comprise a variety of geometrical shapes. Each of handles 330a, 330b also includes a trim piece 340a, 340b removable coupled to inner portions 336a, 336b.

The faucet 310 further includes a printed circuit board (PCB) 350, which is housed on a circuit board housing 352. The circuit board housing 352 is received within an interior of the hub 318. An upper portion of the circuit board housing 352 is releasably engaged with the hose adapter 348. To that end, the circuit board housing 352 illustratively includes a coil spring 358 electrically coupled to the hose adapter 348 and the PCB 350. Because the upper portion 320 is electrically decoupled from the linear portion 322 by the isolator 347, the coil spring 358 provides an electrical pathway from the upper portion 320 to the PCB 350 for proximity sensing technology utilized in the upper portion 320, such as capacitive sensing technology.

In another embodiment, the PCB 350 may include a manually actuatable electrical switch, for example, a toggle switch or a push button, that cycles the first water parameter and the second water parameter between various water parameters. Illustratively, the faucet 310 may be configured during factory assembly such that first water parameter is a water flow rate at the outlet 316, and the second water parameter is a water temperature at the outlet 316. During installation of the faucet 310, the manually actuatable electrical switch may be actuated by a technician or a user such that the first water parameter is a flow rate of hot water from the hot water source 362 delivered to the delivery spout 312, and the second water parameter is a flow rate of cold water from the cold water source 366 delivered to the delivery spout 312.

In the exemplary embodiment shown, the circuit board 350 illustratively includes a plurality of paired single direction magnetic sensors. More specifically, the circuit board 350 includes a first pair of magnetic sensors 351a and a second pair of magnetic sensors 351b. The magnetic sensors 351a, 351b detect the magnetic field associated with the magnets 334a, 334b, respectively. The pair of magnetic sensors 351a are illustratively positioned laterally on the circuit board 350 and in a linear line with one another. Similarly, the pair of magnetic sensors 351b are illustratively positioned laterally on the circuit board 350 and in-line with one another. The pair of magnetic sensors 351b are illustratively arranged longitudinally of the pair of magnetics sensors 351a along a longitudinal axis of the circuit board 350 (e.g., sensors 351b are below sensors 351a).

In the exemplary embodiment shown, the magnetic sensors 351a illustratively detect the magnetic field associated with the magnet 334a, and the magnetic sensors 351b detect the magnetic field associated with the magnet 334b. The magnetic sensors 351a, 351b are communicatively coupled to a controller 360 that controls a first control valve 364 and a second control valve 368 (see FIG. 19). As a result, the signal from the magnetic sensors 351a, 351b is communicated to the controller 360. In one illustrative embodiment, the magnetic sensors 351a, 351b provide two-dimensional detection of the position of the magnets 334a, 334b and, as such, the rotational position of the handles 330a, 330b, respectively. In another embodiment, a pair of two-dimensional sensors are provided to the circuit board 350. One of two-dimensional sensors detects the position of the magnet 334a and the other of the two-dimensional sensors detects the position of the magnet 334b. Illustratively, the magnetic sensors 351a, 351b may comprise board mount Hall-effect sensors. In one embodiment, the magnetic sensors 351a, 351b comprise an SMD/SMT SOT-23-5 board mount Hall-effect sensors.

The circuit board 350 further includes an LED cable 354 and a main cable 356. In one embodiment, the faucet 310 includes a visual indicator, such as an LED, that provides a visual status related to the faucet 310 to the user. For example, the visual indicator may provide visual information regarding water temperature at the outlet 316 or an operating state of the faucet 316. The main cable 354 is in electrical communication with the first control valve 364 and the second control valve 368 (see FIG. 19).

Figure 19:
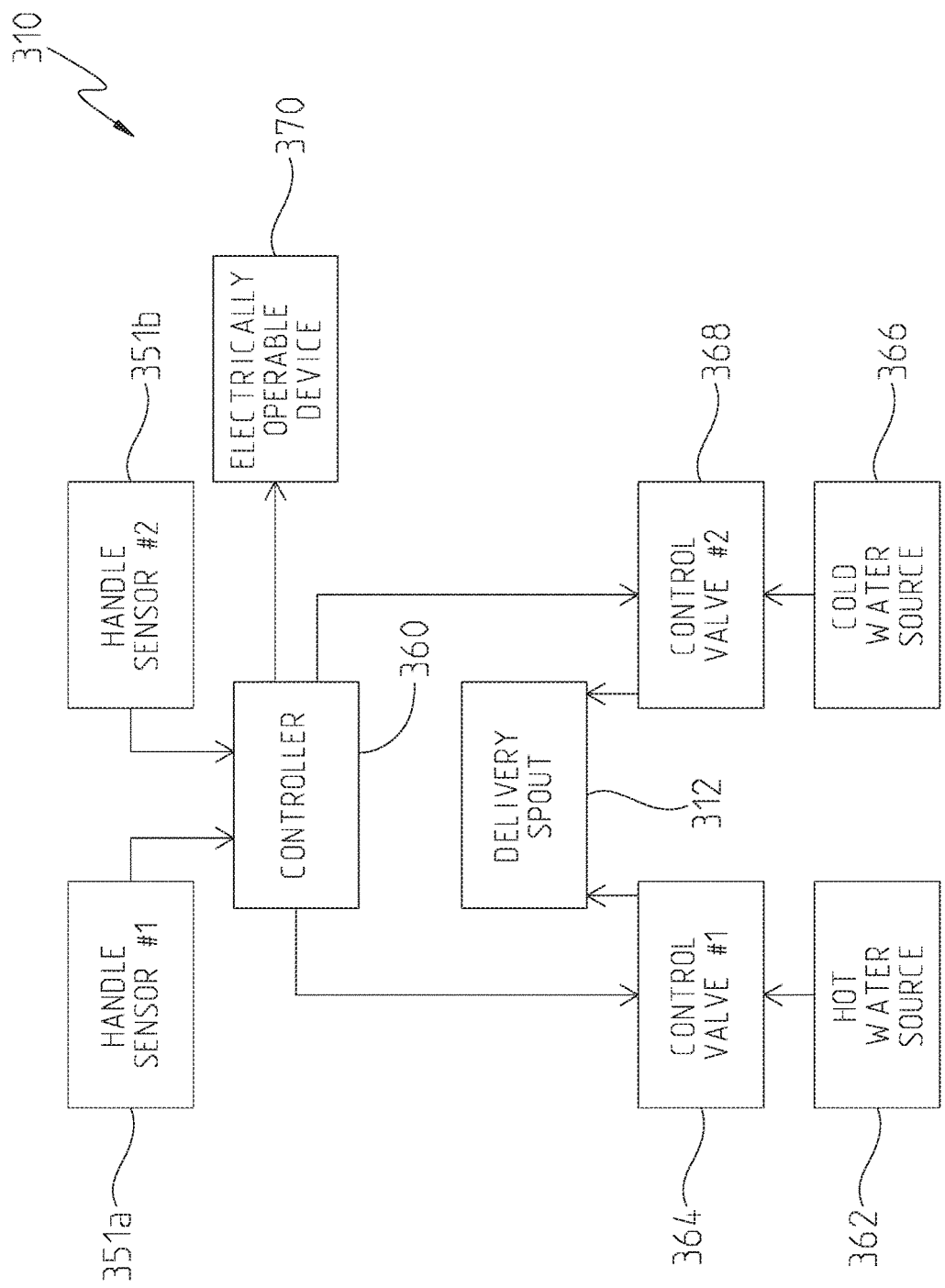
FIG. 19 is a block diagram of the illustrative embodiment of FIG. 16.

Referring further to FIG. 19, a block diagram of the exemplary embodiment is shown. The delivery spout 312 is fluidly coupled to the hot water source 362 and to the cold water source 366. The first control valve 364 is fluidly coupled to the delivery spout 312 and to the hot water source 362. The second control valve 366 is fluidly coupled to the delivery spout 312 and to the cold water source 366. The first control valve 364 and the second control valve 366 are positioned between their respective water sources 362 and 366 and the delivery spout 312. As a result, the control valves 364, 366 control the flow of water to the delivery spout 312. More particularly, the control valves 364, 366 are illustratively electronic proportioning valves including moveable valve members configured to separately control the flow of hot water and cold water. Flexible outlet hose or tube 361 illustratively extends within the delivery spout 312 and fluidly couples outlet ports of the control valves 364 and 366 to the outlet 316 of the sprayhead 326.

In an illustrative embodiment, the controller 360 is configured to control operation of control valves 364 and 366 and, therefore water parameters (e.g., water flow rate, water temperature and/or dispensing volume). In one such illustrative embodiment, the controller 360 may provide controlled dispensing (e.g., volume or metered output) as a water parameter in response to different degrees of rotation of the handles 330a and/or 330b. For example, rotation of handle 330a, 330b to a first degree may provide a first metered output or dispensed amount (e.g., 1 cup), rotation of handle 330a, 330b to a second degree may provide a second metered output or dispensed amount (e.g., 2 cups), etc.

In alternative illustrative embodiments, rotation of the handles 330a and/or 330b may control other faucet/sink related functions. For example, the controller 360 may control operation of another electrically operable device 370 (FIG. 19) in response to rotation of the handles 330a and/or 330b. Such electrically operable device 370 may comprise, for example, a garbage disposal supported under the sink, or an electronic soap dispenser supported on the mounting surface (e.g., sink deck).

While the illustrative embodiment shows two handles 330a and 330b positioned on the linear portion 322 of the delivery spout 312, different numbers and positioning of handles 330 are contemplated. For example, first handle 330a may control water flow rate, second handle 330b may control water temperature, and a third handle (not shown) may control electrically operable device 370.

While shown as two separate valves, it is contemplated that control valves 364, 366 could comprise a single valve body having at least two controllable fluid flow pathways. For example, the control valves 364, 366 may comprise a single electronically operable mixing valve with at least one moveable valve element to control at least one water parameter, for example, the water flow rate or the water temperature at the outlet 316.

The magnetic sensors 351a, 351b of the handles 330a, 330b are communicatively coupled to the controller 360. In turn, the controller 360 is communicatively coupled to the control valves 364, 368. As a result, a signal from the magnetic sensors 351a, 351b is sent to the control 360, which in turns communicates a control signal to the control valves 364, 368. In the exemplary embodiment shown, the controller 360 and the control valves 364, 368 are positioned below the mounting surface.

Figure 25:
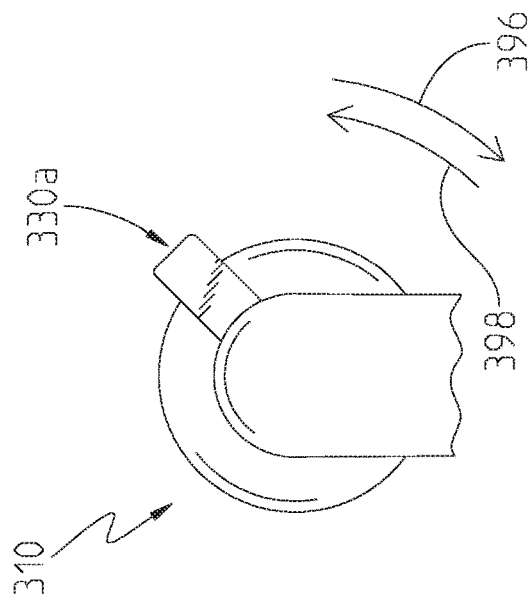
FIG. 25 is a partial top plan view of the illustrative faucet of FIG. 16 with the first handle in the intermediate position and the second handle in a fully rotated away position.
Figure 26:
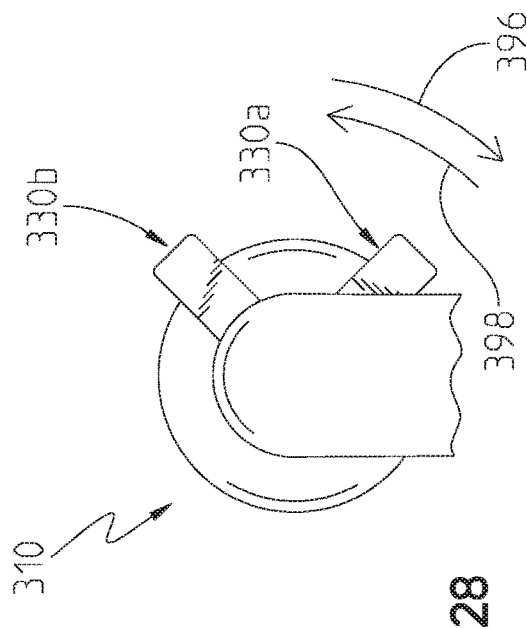
FIG. 26 is a partial top plan view of the illustrative faucet of FIG. 16 with the first handle and second handle in their fully rotated away positions.
Figure 27:
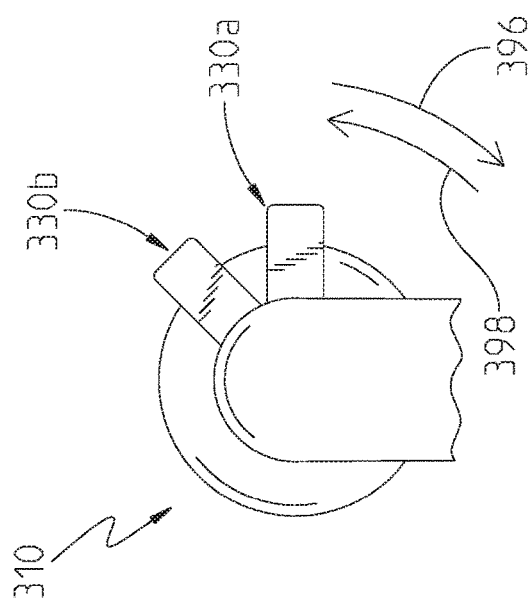
FIG. 27 is a partial top plan view of the illustrative faucet of FIG. 16 with the first handle and the second handle in their fully rotated forward positions.
Figure 28:
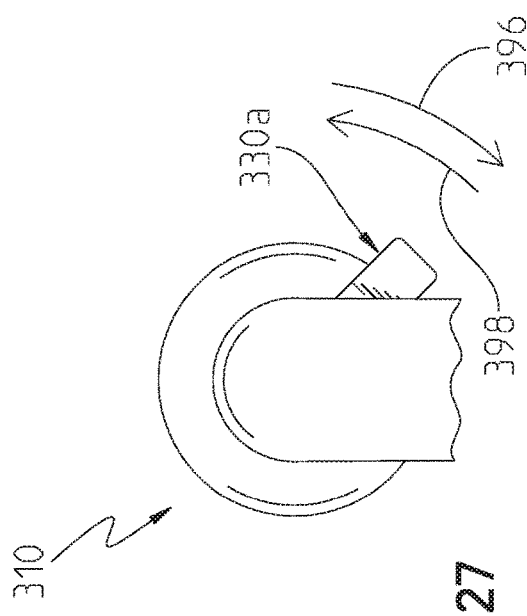
FIG. 28 is a partial top plan view of the illustrative faucet of FIG. 16 with the first handle in the fully rotated forward position and the second handle in the fully rotated away position.

Rotation of the first handle 330a and the second handle 330b about the longitudinal axis 328 controls or varies the first water parameter and the second water parameter, respectively. Illustratively, handles 330a, 330b rotate approximately 90 degrees about the longitudinal axis 328, as illustrated in FIGS. 20-27. More specifically, the handle 330a is moveable between a position rotated 45 degrees about the longitudinal axis in the direction 396 (clockwise as shown in FIGS. 20, 27, and 28) and a position rotated approximately 45 degrees about the longitudinal axis 328 in the direction 398 (counter-clockwise as shown in FIGS. 22, 23, and 26), with a 0 degree position as shown in FIGS. 21, 24, and 25. Likewise, the handle 330b is moveable between a position rotated 45 degrees about the longitudinal axis in the direction 396 (clockwise as shown in FIGS. 23, 24, and 27) and a position rotated approximately 45 degrees about the longitudinal axis 328 in the direction 398 (counter-clockwise as shown in FIGS. 25, 26, and 28), with a 0 degree position as shown in FIGS. 20-22. In the exemplary embodiment shown, the position rotated approximately 45 degrees about the longitudinal axis 328 in the direction 396 (clockwise) relative to the 0 degree position is illustratively toward a user (forward). Similarly, the position rotated approximately 45 degrees about the longitudinal axis 328 in the direction 398 (counter-clockwise) relative to the 0 degree position is illustratively away from the user (rearward).

As the handles 330a, 330b are rotated about the longitudinal axis 328, the magnetic fields associated with the respective magnets 334a, 334b change. The magnetic sensors 351a, 351b detect and communicate the changes in the magnetic field to the controller 360. The controller 360 then converts these changes into commands that are communicated to the control valves 364, 366. In the exemplary embodiment shown, the signal from the magnetic sensors 351a, 351b corresponds to the present angular position of the handles 330a, 330b with respect to the longitudinal axis 328. Further, the angular position of the handles 330a, 330b corresponds to settings of the first water parameter and the second parameter, respectively.

Illustratively, when the handles 330a, 330b are fully rotated in the direction 396 (clockwise) toward a user (forward), the angular position of the handles 330a, 330b corresponds to the first water parameter and the second water parameter at their lowest respective settings. For example, if the first water parameter is a water flow rate at the outlet 316, then the position of the handle 330a fully rotated in the direction 396 toward the user corresponds to a low water flow rate. If the second water parameter is a water temperature at the outlet 316, then the position of the handle 330b fully rotated in the direction 396 toward the user corresponds to a full cold water temperature. In an alternative embodiment, the low water flow rate may be a zero water flow rate. In another alternative embodiment, if the first water parameter is a flow rate of hot water from the hot water source 362 delivered to the delivery spout 312, then the position of the handle 330a fully rotated in the direction 396 toward the user corresponds to a low hot water flow rate. If the second water parameter is a flow of cold water from the cold water source 366 delivered to the delivery spout 312, then the position of the handle 330b fully rotated in the direction 396 toward the user corresponds to a low cold water flow rate. In a further alternative embodiment, the low hot water flow rate and the low cold water flow rate may be a zero water flow rate.

When the handles 330a, 330b are fully rotated in the direction 398 (counter-clockwise) away from the user (rearward), the angular position of the handles 330a, 330b corresponds to the first water parameter and the second water parameter at their highest respective settings. For example, if the first water parameter is a water flow rate at the outlet 316, then the position of the handle 330a fully rotated in the direction 398 away from the user corresponds to a high water flow rate. If the second water parameter is a water temperature at the outlet 316, then the position of the handle 330b fully rotated in the direction 398 away from the user corresponds to a full hot water temperature. In an alternative embodiment, if the first water parameter is a flow rate of hot water from the hot water source 362 delivered to the delivery spout 312, then the position of the handle 330a fully rotated in the direction 398 away from the user corresponds to a high hot water flow rate. If the second water parameter is a flow of cold water from the cold water source 366 delivered to the delivery spout 312, then the position of the handle 330b fully rotated in the direction 398 away from the user corresponds to a high cold water flow rate.

When the handles 330a, 330b are positioned intermediate the fully rotated (forward) position and the fully rotated away (rearward) position, the angular position of the handles 330a, 330b corresponds to the first water parameter and the second water parameter at intermediate settings. For example, if the first water parameter is the water flow rate at the outlet 316, then the position of the handle 330a intermediate the fully rotated toward position and the fully rotated away position corresponds to a water flow rate intermediate the low water flow rate and the high water flow rate. If the second water parameter is the water temperature at the outlet 316, then the position of the handle 330b intermediate the fully rotated toward position and the fully rotated away position corresponds to a water temperature intermediate the full cold water temperature and the full hot water temperature, or full mixing of the cold water flow and the hot water flow. In an alternative embodiment, if the first water parameter is a flow rate of hot water from the hot water source 362 delivered to the delivery spout 312, then the position of the handle 330a intermediate the fully rotated toward position and the fully rotated away position corresponds to a flow rate of hot water intermediate the low hot water flow rate and the high hot water flow rate. If the second water parameter is a flow of cold water from the cold water source 366 delivered to the delivery spout 312, then the position of the handle 330b intermediate the fully rotated toward position and the fully rotated away position corresponds to a flow rate of cold water intermediate the low cold water flow rate and the high cold water flow rate.

Referring specifically to FIG. 20, the handle 330a is in the fully rotated toward (forward) position, and the handle 330b is in the intermediate position. Therefore in the exemplary embodiment shown, the handle 330a corresponds to a low water flow rate and the handle 330b corresponds to a water temperature intermediate the full cold water temperature and the full hot water temperature. In an alternative embodiment, the handle 330a corresponds to a low flow rate of hot water. The handle 330b corresponds to a flow rate of cold water intermediate the low cold water flow rate and the high cold water flow rate. In another alternative embodiment, the low flow rate may correspond to a zero flow rate.

Referring now to FIG. 21, the handles 330a, 330b are in their respective intermediate positions. Therefore in the exemplary embodiment shown, the handle 330a corresponds to water flow rate intermediate the low water flow rate and the high water flow rate. The handle 330b corresponds to a water temperature intermediate the full cold water temperature and the full hot water temperature. In an alternative embodiment, the handle 330a corresponds to a flow rate of hot water intermediate the low hot water flow rate and the high hot water flow rate. The handle 330b corresponds to a flow rate of cold water intermediate the low cold water flow rate and the high cold water flow rate.

Referring now to FIG. 22, the handle 330a is in the fully rotated away (rearward) position, and the handle 330b is in the intermediate position. Therefore in the exemplary embodiment shown, the handle 330a corresponds to a high water flow rate. The handle 330b corresponds to a water temperature intermediate the full cold water temperature and the full hot water temperature. In an alternative embodiment, the handle 330a corresponds to a high flow rate of hot water. The handle 330b corresponds to a flow rate of cold water intermediate the low cold water flow rate and the high cold water flow rate.

Referring now to FIG. 23, the handle 330a is in the fully rotated away (rearward) position and the handle 330b is in the fully rotated toward (forward) position. Therefore in the exemplary embodiment shown, the handle 330a corresponds to a high water flow rate. The handle 330b corresponds to a full cold water temperature. In an alternative embodiment, the handle 330a corresponds to a high flow rate of hot water. The handle 330b corresponds to a low flow rate of cold water. In another alternative embodiment, the low flow rate may correspond to a zero flow rate.

Referring now to FIG. 24, the handle 330a is in the intermediate position, and the handle 330b is in the fully rotated toward (forward) position. Therefore in the exemplary embodiment shown, the handle 330a corresponds to a water flow rate intermediate the low water flow rate and the high water flow rate. The handle 330b corresponds to a full cold water temperature. In an alternative embodiment, the handle 330a corresponds to a flow rate of hot water intermediate the low hot water flow rate and the high hot water flow rate. The handle 330b corresponds to a low flow rate of cold water. In another alternative embodiment, the low flow rate may correspond to a zero flow rate.

Referring now to FIG. 25, the handle 330a is in the intermediate position, and the handle 330b is in the fully rotated away (rearward) position. Therefore in the exemplary embodiment shown, the handle 330a corresponds to a water flow rate intermediate the low water flow rate and the high water flow rate. The handle 330b corresponds to a full hot water temperature. In an alternative embodiment, the handle 330a corresponds to a flow rate of hot water intermediate the low hot water flow rate and the high hot water flow rate. The handle 330b corresponds to a high flow rate of cold water. In another alternative embodiment, the low flow rate may correspond to a zero flow rate.

Referring now to FIG. 26, the handles 330a, 330b are in their respective fully rotated away (rearward) positions. Therefore in the exemplary embodiment shown, the handle 330a corresponds to a high water flow rate and the handle 330b corresponds to a full hot water temperature. In an alternative embodiment, the handle 330a corresponds to high flow rate of hot water and the handle 330b corresponds to a high flow rate of cold water. In such an embodiment, the position of the handles 330a, 330b shown in FIG. 27 would correspond to a fully open or on state of the faucet 310.

Referring now to FIG. 27, the handles 330a, 330b are in their respective fully rotated toward (forward) positions. Therefore the handle 330a corresponds to a low water flow rate and the handle 330b corresponds to a full cold water temperature. In an alternative embodiment, the handle 330a corresponds to a low flow rate of hot water and the handle 330b corresponds to a low flow rate of cold water. In another alternative embodiment, the low flow rate may correspond to a zero flow rate. In such an embodiment, the position of the handles 330a, 330b shown in FIG. 27 would correspond to a non-flow or an off state of the faucet 310.

Referring now to FIG. 28, the handle 330a is in the fully rotated toward (forward) position, and the handle 330b is in the fully rotated away (rearward) position. Therefore in the exemplary embodiment shown, the handle 330a corresponds to a low water flow rate and the handle 330b corresponds to a full hot water temperature. In an alternative embodiment, the handle 330a corresponds to a low flow rate of hot water and the handle 330b corresponds to high flow rate of cold water. In another alternative embodiment, the low flow rate may correspond to a zero flow rate.

Although the invention has been described in detail with reference to certain preferred embodiments, variations and modifications exist within the spirit and scope of the invention as described and defined in the following claims.

The invention claimed is:

1. A faucet user interface comprising:
    a hub extending along a longitudinal axis;
    a first handle operably coupled to the hub;
    a second handle operably coupled to the hub and coaxially aligned with the first handle along the longitudinal axis;
    a first sensor supported by the hub and operably coupled to the first handle, the first sensor configured to detect an angular position of the first handle about the longitudinal axis;
    a second sensor supported by the hub and operably coupled to the second handle, the second sensor configured to detect an angular position of the second handle about the longitudinal axis;
    a controller in electrical communication with the first sensor and the second sensor; and
    a first electrically operable valve in electrical communication with the controller;
    wherein the first handle and the second handle are independently rotatable about the longitudinal axis, the rotation of the first handle about the longitudinal axis controlling a first water parameter and the rotation of the second handle about the longitudinal axis controlling a second water parameter.

2. The faucet user interface of claim 1, wherein the first water parameter is a water flow rate, and the second water parameter is a water temperature.

3. The faucet user interface of claim 1, further comprising a delivery spout defining the hub and including an outlet for discharging water, wherein the first handle includes a first collar concentrically receiving the delivery spout, and the second handle includes a second collar concentrically receiving the delivery spout.

4. The faucet user interface of claim 3, wherein the first handle includes a first blade extending radially outwardly from the first collar and the second handle includes a second blade extending radially outwardly from the second collar.

5. The faucet user interface of claim 1, further comprising a second electrically operable valve in electrical communication with the controller.

6. The faucet user interface of claim 1, further comprising:
    a first magnet supported by the first handle, wherein the first sensor is configured to detect a position of the first magnet; and
    a second magnet supported by the second handle, wherein the second sensor is configured to detect a position of the second magnet.

7. The faucet user interface of claim 1, wherein the first electrically operable valve comprises a mixing valve in fluid communication with a hot water source and a cold water source.

8. The faucet user interface of claim 1, wherein the second handle is vertically spaced relative to the first handle along the longitudinal axis.

9. A faucet comprising:
    a delivery spout including an inlet, an outlet and a linear portion positioned intermediate the inlet and the outlet and extending along a longitudinal axis;
    a first handle supported by the linear portion of the delivery spout;
    a second handle supported by the linear portion of the delivery spout;
    a first electrically operable valve in fluid communication with the outlet of the delivery spout;
    a controller in electrical communication with the first electrically operable valve;
    a first sensor and a second sensor supported by the delivery spout and in electrical communication with the controller; and
    wherein rotation of the first handle about the longitudinal axis of the delivery spout is detected by the first sensor for controlling a first water parameter, and rotation of the second handle about the longitudinal axis of the delivery spout is detected by the second sensor for controlling a second water parameter.

10. The faucet of claim 9, wherein the first water parameter is a water flow rate, and the second water parameter is a water temperature.

11. The faucet of claim 10, wherein the water flow rate is the water flow rate at the outlet and the water temperature is the water temperature at the outlet.

12. The faucet of claim 9, wherein:
    the first handle includes a first collar concentrically receiving the delivery spout, and a first blade extending radially outwardly from the first collar; and
    the second handle includes a second collar concentrically receiving the delivery spout, and a second blade extending radially outwardly from the second collar.

13. The faucet of claim 9, further comprising:
a first magnet supported by the first handle, wherein the first sensor is configured to detect a position of the first magnet; and
a second magnet supported by the second handle, wherein the second sensor is configured to detect a position of the second magnet.

14. The faucet of claim 9, further comprising a second electrically operable valve in fluid communication with the outlet of the delivery spout.

15. The faucet of claim 9, wherein the second handle is arranged longitudinally of the first handle along the longitudinal axis.

16. The faucet of claim 9, wherein the first sensor comprises a pair of Hall-effect sensors, and a first magnet is supported for rotation with the first handle.

17. The faucet of claim 16, wherein the second sensor comprises a pair of Hall-effect sensors, and a second magnet is supported for rotation with the second handle.

18. A faucet comprising:
a delivery spout including an inlet, an outlet and a center axis extending between the inlet and the outlet;
a first handle rotatably supported by the delivery spout;
a second handle rotatably supported by the delivery spout;
a first sensor supported by the delivery spout and operably coupled to the first handle;
a second sensor supported by the delivery spout and operably coupled to the second handle;
a controller in electrical communication with the first sensor and the second sensor;
wherein rotation of the first handle about the center axis of the delivery spout is detected by the first sensor, and rotation of the second handle about the center axis of the delivery spout is detected by the second sensor;
a first electrically operable valve in electrical communication with the controller and in fluid communication with the outlet of the delivery spout and a hot water source;
a second electrically operable valve in electrical communication with the controller and in fluid communication with the outlet of the delivery spout and a cold water source; and
wherein rotation of the first handle about the center axis of the delivery spout is detected by the first sensor to control water flow rate at the outlet, and rotation of the second handle about the center axis of the delivery spout is detected by the second sensor to control water temperature at the outlet.

19. The faucet of claim 18, wherein:
the first handle includes a first collar concentrically receiving the delivery spout, and a first blade extending radially outwardly from the first collar; and
the second handle includes a second collar concentrically receiving the delivery spout, and a second blade extending radially outwardly from the second collar.

20. The faucet of claim 18, further comprising:
a first magnet supported by the first handle, wherein the first sensor is configured to detect a position of the first magnet; and
a second magnet supported by the second handle, wherein the second sensor is configured to detect a position of the second magnet.

21. The faucet of claim 20, wherein the first sensor comprises a pair of Hall-effect sensors configured to detect the first magnet supported by the first handle.

22. The faucet of claim 21, wherein the second sensor comprises a pair of Hall-effect sensors configured to detect the second magnet supported by the second handle.

* * * * *